(12) United States Patent
Ichikawa et al.

(10) Patent No.: US 6,959,141 B1
(45) Date of Patent: Oct. 25, 2005

(54) DATA REPRODUCTION APPARATUS AND REPRODUCTION METHOD

(75) Inventors: Takahiro Ichikawa, Saitama (JP); Takayuki Ishida, Kanagawa (JP); Yoshinori Shimizu, Tokyo (JP); Shigeharu Sato, Chiba (JP); Kenji Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1040 days.

(21) Appl. No.: 09/695,889

(22) Filed: Oct. 25, 2000

(30) Foreign Application Priority Data

Oct. 26, 1999 (JP) ................................. 11-304623

(51) Int. Cl.$^7$ ............................................. H04N 5/91
(52) U.S. Cl. ............................ 386/95; 386/98; 386/125
(58) Field of Search ...................... 386/2, 3, 21, 47–50, 386/116, 124, 84, 95, 98, 125; 348/616; 360/32, 360/48, 53; 369/47.15, 84, 48

(56) References Cited

U.S. PATENT DOCUMENTS

| | | | |
|---|---|---|---|
| 5,392,129 A * | 2/1995 | Ohtaka et al. ............... | 386/48 |
| 5,920,529 A * | 7/1999 | Ota et al. ..................... | 386/84 |
| 6,035,092 A * | 3/2000 | Fujinami ...................... | 386/47 |
| RE37,327 E * | 8/2001 | Yonemitsu et al. .......... | 386/116 |
| 6,308,004 B2 * | 10/2001 | Kawamura et al. .......... | 386/116 |

* cited by examiner

Primary Examiner—James J. Groody
Assistant Examiner—Christopher Onuaku
(74) Attorney, Agent, or Firm—Frommer Lawrence & Haug LLP; William S. Frommer

(57) ABSTRACT

A data reproduction apparatus and a data reproduction method can alleviate the workload of a special processing operation of fast forward or reverse data reproduction and improve the data access speed for fast reproduction of data. The data reproduction apparatus comprises an optical pickup 2 for reproducing data from an optical disk 1, a sector detector 4 for detecting a first piece of data information indicating if a data is to be output as signal or not, a ring buffer memory 6 for storing data, an error correction circuit 7 for correcting errors in the data to be output as signal as indicated by the first piece of data information out of the stored data, a stream detector 10 for detecting a second piece of data information indicating the data to be out as signal out of the data corrected for errors, decoders 13, 16 for decoding the data corrected for errors and stored in the ring buffer memory 6 as signal to be reproduced and a system controller 22 for control the data to be decoded and the data not to be decoded by referring to the first piece of data information and the second piece of data information detected by a second data information detection means.

18 Claims, 15 Drawing Sheets

| 32BITS | 1456BITS | 32BITS | 1458BITS |
|---|---|---|---|
| SY0 | ID IED | SY5 | P1 |
| SY1 | | SY5 | P1 |
| SY2 | | SY5 | P1 |
| SY3 | | SY5 | P1 |
| SY4 | | SY5 | P1 |
| SY1 | | SY6 | P1 |
| SY2 | | SY6 | P1 |
| SY3 | | SY6 | P1 |
| SY4 | | SY6 | P1 |
| SY1 | | SY7 | P1 |
| SY2 | | SY7 | P1 |
| SY3 | | SY7 | EDC P1 |
| SY4 | P0 | SY7 | P0 P1 |

FIG.9

FIG.10A
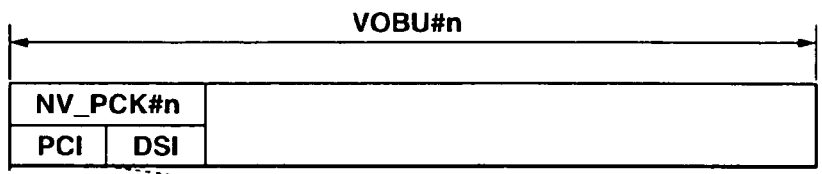
FIG.10B
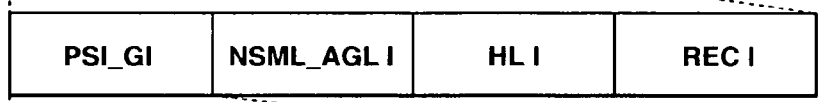
FIG.10C
| | Content |
|---|---|
| (1)NV_PCK_LBN | LBN of Navigation pack |
| (2)VOBU_CAT | Category of VOBU |
| reserved | reserved |
| (3)VOBU_UOP_CTL | User Operation control of VOBU |
| (4)VOBU_S_PTM | Start PTM of VOBU |
| (5)VOBU_E_PTM | End PTM of VOBU |
| (6)VOBU_SE_E_PTM | Eun PTM of scqurnce end in VOBU |
| (7)C_SLIM | Cell Elpse Time |

FIG.11A 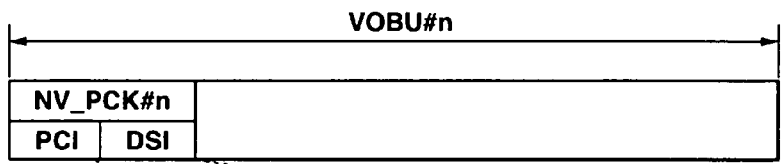

FIG.11B 

FIG.11C

|  | Content |
|---|---|
| (1)NV_PCK_SCR | SCR_base of NV_PCK |
| (2)NV_PCK_LBN | LBN of NV_PCK |
| (3)VOBU_EA | End address of VOBU |
| (4)VOBU_1STREF_EA | End address of the first Reference Picture in VOBU |
| (5)VOBU_2NDREF_EA | End address of the second Reference Picture in VOBU |
| (6)VOBU_3RDREF_EA | End address of the third Reference Picture in VOBU |
| (7)VOBU_VOB_I DN | VOBU ID number of the VOBU |
| reserved | reserved |
| (8)VOBU_C_I DN | Cell ID number of the VOBU |
| (9)C_ELTIM | Cell Elpse Time |

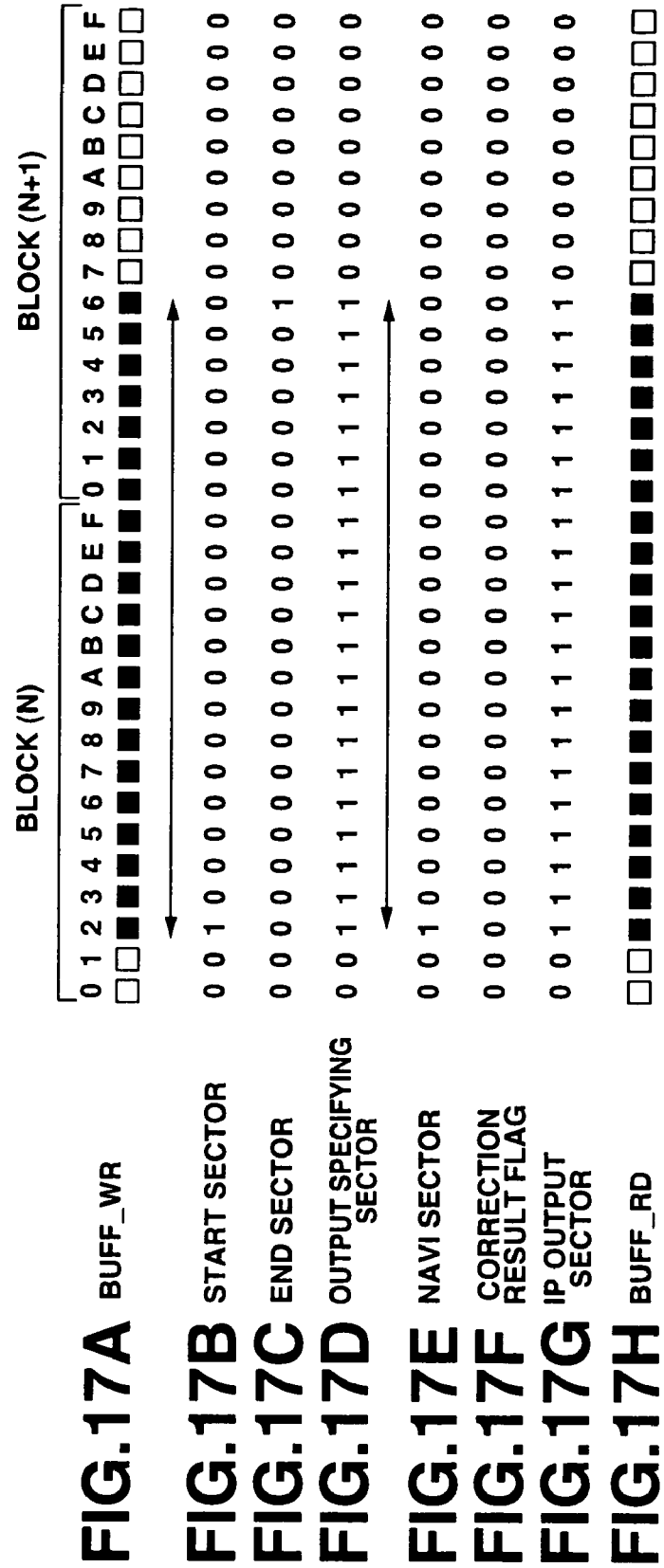

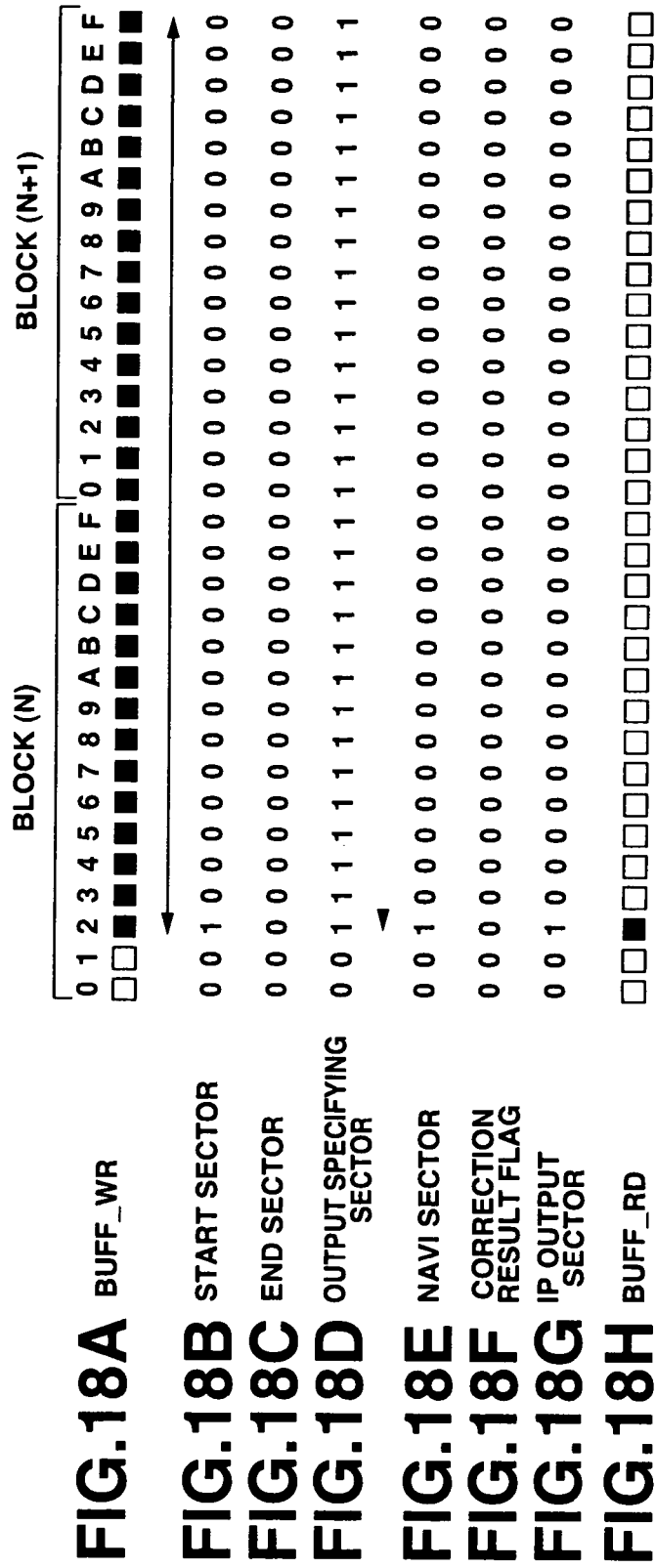

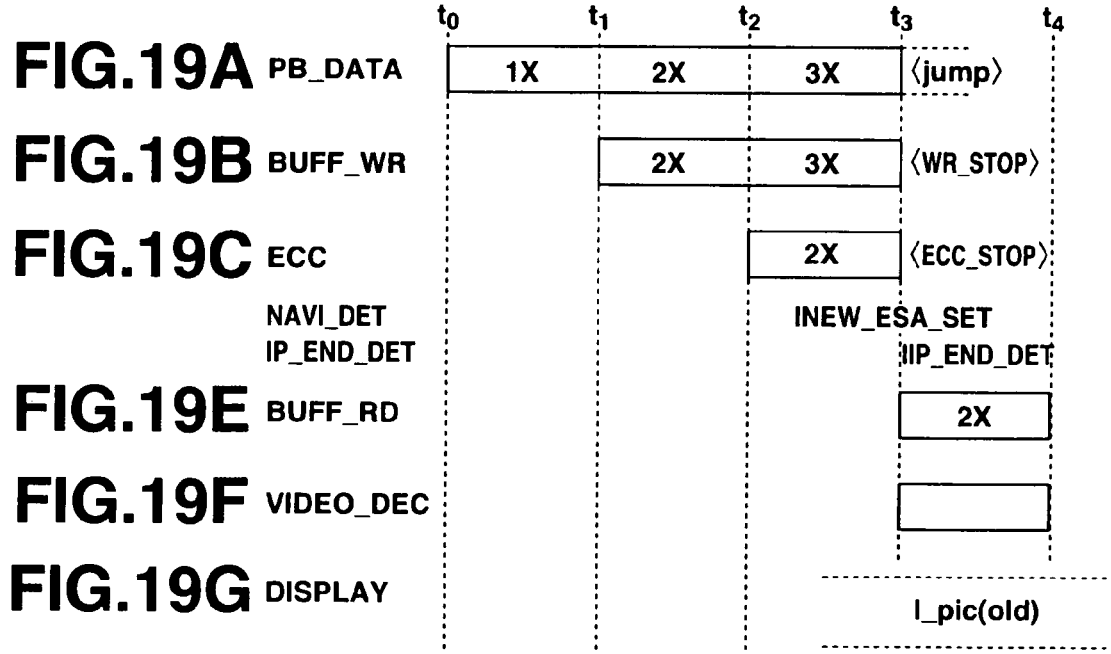

DATA REPRODUCTION APPARATUS AND REPRODUCTION METHOD

BACKGROUND OF THE INVENTION

1. Field of the Invention

This invention relates to a data reproduction apparatus and a data reproduction method that can suitably be used for time series fast forward or reverse reproduction of video data or audio data recorded in a disk-shaped recording medium such as an optical disk or a magneto-optical disk.

2. Related Background Art

FIG. 1 of the accompanying drawings schematically illustrates a known optical disk apparatus for reproducing a moving image or a sound recorded on a recording medium such as an optical disk by means of an image encoding technique conforming to certain predetermined standards such as the MPEG (Moving Picture Experts Group) Standards. The optical disk apparatus 100 is adapted to replay a optical disk (DVD: Digital Video Disk) that can store a large amount of data by using a laser beam having a short wavelength and an objective lens having a large numerical aperture.

The optical disk apparatus 100 reproduces image data stored on an optical disk 101 by way of the laser beam emitted to irradiate and reflected by optical disk 101, using optical pickup 102. The image data detected by the optical pickup 102 is input to and demodulated by demodulation circuit 103. The image data demodulated by the demodulation circuit 103 is fed to ring buffer memory 106 by way of sector detector 104, memory controller 105 and subjected to a series of processing operations including error correction and decoding before it is output.

Sector detector 104 in FIG. 1 detects sector address numbers (the addresses assigned to sectors of the optical disk 101) out of the data demodulated by the demodulation circuit 103 and outputs them to the memory controller 105. If the sector detector 104 cannot detect sector address numbers or, if it can, the detected numbers are not consecutive, it outputs a sector address number abnormal signal to track jump control circuit 107.

Error correction circuit 108 reads out the data supplied from the demodulation circuit 103 by way of the sector detector 104 and stored in the ring buffer memory 106 and, if it detects an error, it corrects the error by using the parity bits (parity data) added to the data. If the error correction circuit 108 cannot correct the data error through the error correcting operation, it outputs an error occurrence signal to the track jump control circuit 107. The data whose error is not corrected is subjected to a descrambling operation of descramble circuit 109 and an error detecting operation of error detector 110 and then fed to the ring buffer memory 106, which stores the data under the control of the memory controller 105.

The memory controller 105 controls the data to be stored in the ring buffer memory 106. The memory controller 105 reads out the sector address number of each sector of the optical disk 101 and specifies the write address (the write pointer WP) for storing (writing) the data from the sector detector 104 corresponding to the sector address number in the ring buffer memory 106. The memory controller 105 also determines if the data volume of the data from the sector detector 104 stored in the ring buffer memory 106 exceeds the capacity of the ECC (error correction codes) block or not and specifies the address to be used for reading out data from the ring buffer memory 106 to the error correction circuit 108 and the address (ECC ending pointer EP) to be used for storing the data corrected for errors in the ring buffer memory 106.

The memory controller 105 also specifies the read address (output pointer RP) of the data written in the ring buffer memory 106 on the basis of the code request signal from video decoder 112 and audio decoder 113 that are arranged downstream. Data is read out from the ring buffer memory 106 according to the request signal.

The reproduced and output data is then supplied from the ring buffer memory 106 to demultiplexer 111. The demultiplexer 111 separates the video data and the audio data according to the packet header information supplied to it. The isolated video data is then supplied to the video decoder 112 by way of video buffer 114, while the audio data is supplied to the audio decoder 113 by way of audio buffer 115. The video decoder 112 typically decodes the data according to MPEG 2. The video data and the audio data decoded in a manner as described above are then subjected to D/A conversion and other processing operations before output through output terminal 116 and output terminal 117 respectively.

In the above described known optical disk apparatus 100, the data written in the ring buffer memory 106 is subjected to an error correcting operation in a manner as described above and subsequently supplied to the video buffer 114 according to the code request signal from the video decoder 112. If data of simple images are continuously processed so that data are transferred from the video buffer 114 to the video decoder 112 at a low rate, the rate of transferring data from the ring buffer memory 106 to the video buffer 114 also falls. Then, the amount of data stored in the ring buffer memory 106 increases to give rise to an overflow state. Then, the track jump control circuit 107 determines (detects) the amount of data currently stored in the ring buffer memory 106 on the basis of the write pointer WP and the output pointer RP controlled by the memory controller 105 and, if the data volume exceeds a predetermined reference value, it so judges that the ring buffer memory 106 can overflow and outputs a track jump command to servo circuit 118.

Upon detecting an sector address number abnormal signal from the sector detector 104 or an error occurrence signal from the error correction circuit 108, the track jump control circuit 107 determines the amount of outputtable data remaining in the ring buffer memory 106 on the basis of the ECC ending pointer EP and the output pointer RP that are controlled by the memory controller 105 and, at the same time, the amount of data necessary for ensuring a successful operation of reading data from the ring buffer memory 106 to the video buffer 114, starting from the current track position, while the optical disk 101 makes a full turn (during the time waiting for a full turn of the optical disk 101). So long as the ring buffer memory 106 contains a large amount of date remaining in it, no underflow occurs in the ring buffer memory 106 if data are read out of it at a maximal transfer rate. Therefore, the track jump control circuit 107 judges that any error can be corrected by causing the optical pickup 102 to once again reproduce data from the position where the error occurred and outputs a track jump command to the servo circuit 118.

Upon receiving the track jump command output from the track jump control circuit 107, the servo circuit 118 give rise to a track jump for the replay position of the optical pickup 102. More specifically, if, for instance, data are recorded from the inner periphery toward the outer periphery of the optical disk 101, the servo circuit 118 causes the optical pickup 102 to jump from the current position to the adjacent inner track. Then, any new data write to the ring buffer memory 106 is prohibited until the optical pickup 102 makes a full turn and returns to the original replay position and therefore until the sector address number obtained by the sector detector 104 becomes equal to the one obtained at the time of the track jump and, if necessary, the data already stored in the ring buffer memory 106 are transferred to the video buffer 114.

After the track jump, the operation of writing data into the ring buffer memory 106 is not resumed and another track jump takes place if the sector address number obtained from the sector detector 104 agrees with the one obtained at the time of the track jump provided that the amount of data stored in the ring buffer memory 106 exceeds a predetermined reference value and hence the ring buffer memory 106 can overflow.

The system controller 121 controls the above described system components and specifies the data to be written to and reproduced from the ring buffer memory 106 as sector address number in advance to the sector detector 104. For example, the system controller 121 specifies a write start specifying address (SSA) and a write end specifying address (ESA). When reproducing the data stored in the optical disk 101, the system controller 121 outputs a track jump command to the servo circuit 118 by the supply of the write start specifying address SSA to the truck jump control circuit 107. Then, the servo circuit 118 drives the optical pickup 102 and causes it to jump to the track position having the write start specifying address SSA. The sector detector 104 detects sector address numbers from the data demodulated by the demodulation circuit 103 and outputs it to the memory controller 105. Then, the memory controller 105 reads the sector address number of each sector of the optical disk 101 and compares it with the write start specifying address SSA and the write end specifying address ESA to see if they agree with each other or not.

In the case of a DVD, data are written to the ring buffer memory 106 in a unit of ECC block for every 16 sectors. In other words, the data starting from the ECC block containing the data of the sector showing a sector address number agreeing with the write start specifying address SSA and ending at the EEC block containing the data of the sector showing a sector address number agreeing with the write end specifying address ESA are written to the ring buffer memory 106.

On the other hand, the sector detector 104 generates start sector information, end sector information and output-specified sector information for each sector and writes them as sector information in a predetermined region of the ring buffer memory 106 with other data. Said start sector information, end sector information and output-specified sector information are expressed as 1-bit information, of which the start sector information is made equal to "1" when the sector address of the sector detected by the sector detector 104 agrees with the write start specifying address SSA and the end sector information is made equal to "1" when the sector address of the sector detected by the sector detector 104 agrees with the write end specifying address ESA, while the output-specified sector information is made equal to "1" when the sector address of the sector detected by the sector detector 104 is the write start specifying address SSA or the write end specifying address ESA.

The above sector information is read out of the ring buffer memory 106 by the memory controller 105 when data are read out of the ring buffer memory 106 to the demultiplexer 111 after the error correction, the descrambling and the error detection and before reading data on a sector by sector basis. Then, the memory controller 105 determines if it outputs the read out sector information to the downstream decoders 112, 113 or not on the basis of the bit of the output-specified sector information and uses the sector information to determine if it outputs the data strobe signal that is output from the ring buffer memory 106 with data or not. The decoders 112, 113 receive data from the ring buffer memory 106 if the data strobe signal is found to be effective, whereas the decoders 112, 113 do not receive data from the ring buffer memory 106 if the data strobe signal is not effective. This operation is effective for outputting data when the write start specifying address SSA and the write end specifying address ESA at the DVD are respectively not the leading sector and the tail end sector in the ECC block.

If, for instance, the data of sector (2) through sector (D) of ECC block (N) are specified for output as shown in FIG. 2, the data of sector (0) through sector (F) of ECC block (N) are written to the ring buffer memory 106 and subjected to error correction. Subsequently, as the data of sector (4) through sector (C) of ECC block (M) are specified for output, the data of sector (0) through sector (F) of ECC block (M) are written to the ring buffer memory 106 and subjected to error correction. With regard to the data subjected to error correction, only the data strobe signals (STB) of the data (DATA) of the sectors specified for output become effective as shown in FIG. 3. In the case of the decoders 112, 113, the data (DATA) with the data strobe signal (STB) equal to "1" are received at the time when clock (CLK) is "1". In FIG. 3, "*" denotes that the data showing it is effective. As described above, in a conventional optical disk apparatus 100, the system controller 121 utilizes sector information for the operation of data reproduction without specifying each of the sectors from which data are reproduced for controlling the output of the ring buffer memory 106.

When a conventional optical disk apparatus 100 having the above described configuration is operated for fast forward or reverse reproduction of data so that only an I picture conforming to the MPEG Standards are decoded and reproduced fast by means of the video decoder 112, the last address of the video data storage area of the optical disk 101 where the data corresponding to the I picture is recorded is detected by analysing the data search information contained in the reproduced data.

Now, for instance, when an DVD (digital video disk) is driven for a special operation of fast forward or reverse data reproduction, a data referred to as NAVI pack (NV_PCK) is utilized.

In the DVD format, a cell is used as basic unit for the processing operation of reproducing the contents of information and then a video object unit (VOBU) obtained by dividing a cell is used as minimum reproduction unit of 0.4 to 1.2 seconds. A navigation pack (NV_PCK) is arranged at the top of the minimal reproduction unit of VOBU as control information pack.

The NAVI pack contains a PCI packet that contains presentation control information (PCI) and data search information (DSI) for detecting data. These pieces of information are typically used as VOBU address information for scanning both the front and the back of the VOBU that is the minimal reproduction unit for fast reproduction of data.

Thus, when the optical disk apparatus 100 is used for fast forward or reverse data reproduction in the DVD format, NV_PCK_LBN showing the end address of the NAVI pack itself and the end address VOBU_1STREF_EA of the I picture that is detected first from the NAVI pack are taken out the end address of the area where the data of the I picture is arranged is determined by using the sector address number that is obtained by adding NV_PCK_LBN and VOBU_1STREF_EA. Note that the data of the NAVI pack are taken out of the sector data that are reproduced and confirmed for not containing any error as a result of error correction, disk sampling and error detection.

Then, when the optical disk apparatus 100 starts reproducing data, the sector address number containing the data of the NAVI pack arranged at the top of the VOBU to be reproduced is selected as write start specifying address SSA and a sector address number by far larger than the write start specifying address SSA is selected as write end specifying address ESA before starting the data reproduction. After starting the data reproducing operation and carrying out a series of processing operations including sector detection, buffering, error correction, descrambling and error detection, the data containing the I picture is taken into the ring buffer memory 106 by reselecting the sector address number obtained by adding NV_PCK_LBN and VOBU_1STREF_EA out of the data of the NAVI pack. When the operation of taking the data into the ring buffer memory 106 is over, the optical pickup 102 is made to jump to a track separated from the current track by a predetermined number of tracks and the data is output from the ring buffer memory 106 to the decoders 112, 113 so that only the I picture is reproduced.

As described above, with the known optical disk apparatus 100, VOBU_*REF_EA (*: 1st, 2nd or 3rd) and NV_PCK_LBN of the NAVI pack are referenced to control the output of the ring buffer memory 106 for fast reproduction of data.

Meanwhile, in an operation of fast forward reproduction of reproducing only I pictures, if the sector address number containing the leading NAVI pack of NOBU is 22 as shown in FIG. 4, firstly 22 is selected for the write start specifying address SSA and 99 that is a sector address number by far large relative to the write start specifying address SSA is selected for the write end specifying number to start reproducing data (PB_DATA) (in FIG. 4(a), time $t_0$). In FIG. 4, 1X, 2X, 3X and 4X denotes respective ECC blocks, each comprising 16 sectors. Thus, the ECC blocks respectively comprise sector (10) through sector (1F), sector (20) through sector (2F), sector (30) through sector (3F) and sector (40) through sector (4F).

As the sector (20) is detected by the sector detector 104, the operation of writing data that are corrected for errors in sectors (20) through (4F) of the ring buffer memory 106 starts at time $t_1$ and that of writing the sector information on sectors (20) through (4F) also starts (in FIG. 4(b), BUFF_WR).

When data for an ECC block is written in the ring buffer memory 106, an operation of error correction and error detection starts at time $t_2$ (in FIG. 4 (c), ECC).

The stream detector analyses the data that are corrected for errors, takes out NV_PCK_LBN (=22) and VOBU_1STREF_EA (=21) from the NAVI pack data and then reselects the sector address number obtained by adding NV_PCK_LBN and VOBU_1STREF_EA as write end specifying address ESA (=43) (in FIG. 4(d), NAVI_DET, !NEW_ESA_SET).

When the sector (50) is detected by the sector detector 104, the operation of writing data in the ring buffer memory 106 is terminated at time $t_4$. When the operation of error correction ends, the data of sectors (22) through (43) are output to the video decoder 112 according to the sector information (in FIG. 4(e), BUFF_RD).

Then, the video decoder 112 starts a decoding operation at time $t_3$ (in FIG. 4(f), VIDEO_DEC). When the decoding operation is completed, the data are displayed ((g) in FIG. 4, DISPLAY) and the optical pickup 102 is caused to make a track jump ((a) in FIG. 4, Jamp).

If VOBU_1STREF_EA is equal to 0, it is necessary to supply only the data of NV_PCK to the demultiplexer 111. In the above described processing operation, the sector address number (=22) obtained by adding NV_PCK_LBN and VOBU_1STREF_EA is deemed to be equal to the section address number of NV_PCK_LBN if VOBU_1STREF_EA is equal to 0 and the write end specifying address ESA is reselected for data reproduction.

However, the data to be reproduced have already passed by the sector (22) if the write end specifying address ESA of the ring buffer memory 106 is updated. Therefore, the sector detector 104 cannot detect the write end specifying address ESA if the data reproducing operation is continued. Additionally, since the sector detector 104 does not detects the write end specifying address ESA, all the sector information written into the ring buffer memory 106 that follows the write start specifying address SSA becomes output-specified sector information so that the data of the sectors following the data of NV_PCK that are not to be reproduced are also supplied to the demultiplexer 111 and inevitably subjected to the processing operations that take place downstream relative to the demultiplexer 111.

On the other hand, the known optical disk apparatus 100 normally carriers out the processing operation as shown in FIG. 5 for fast forward reproduction of reproducing only I pictures.

Referring to FIG. 5(e), firstly the system controller 121 so controls the system as to suspend any output from the ring buffer memory 106 to the demultiplexer 111 (RD_STOP).

Then, the system controller 121 controls the memory controller 105 to start reproducing I pictures, using write start specifying address SSA (=22) and write end specifying address ESA (=99) (in FIG. 5(a), PB_DATA).

Thereafter, when the sector detector 104 detects sector (20), the system controller 121 so controls the system as to start writing data and sector information into the ring buffer memory 106 (in FIG. 5(b), BUFF_WR).

When data for an ECC block is written into the ring buffer memory 106, the system controller 121 causes the system to start error correction and error detection (in FIG. 5(c), ECC).

Subsequently, the system controller 121 analyses the data that are subjected to error correction. Then, it takes out NAVI_PCK_LBN (=22) and VOBU_1STREF_EA (=0) from the NAVI pack data and reselects the sector address number obtained by adding NV_PCK_LBN and VOBU_1STREF_EA as write end specifying address (=22) (in FIG. 5(d), NAVI_DET).

Thereafter, the system controller 121 reads out the address of the data that is currently being reproduced from the sector detector 104 and compares it with the reselected write end specifying address ESA. If the address of the data being reproduced has already passed by the write end specifying address, it instructs the memory controller 105 so as to suspend the operation of writing data into the ring buffer memory 106 (WR_STOP).

Additionally, when the operation of correcting errors in the ECC block containing the write start specifying address SSA and the reselected write end specifying address ESA is completed, the system controller 121 causes the memory controller 105 to stop the operation of error correction and error detection (ECC_STOP). Furthermore, when the operation of correcting errors in the ECC block containing the write start specifying address SSA and the reselected write end specifying address ESA is completed, the system controller 121 so controls the track jump control circuit 107 as to cause the optical pickup 102 to start jumping tracks (jamp).

Then, the system controller 121 so controllers the memory controller 105 to cause the ring buffer memory 106 to output only the data of NV_PCK to the demultiplexer 111 (in FIG. 5(*e*), RD_START).

Subsequently, the video decoder 112 decodes NV_PCK ((in FIG. 5(*f*), VIDEO_DEC) and, hence there exists no data, it does not updates the display (in FIG. 5(*g*), DISPLAY).

Thus, when only the data of NV_PCK is output from the ring buffer memory 106 to the video decoder 112 of the conventional optical disk apparatus 100 during an operation of fast data reproduction, the system controller 121 more often than not controls the memory controller 105 so as to make it carry out a processing operation of specifying a pointer for the ring buffer memory 106 and outputting only the data of NV_PCK to the decoders 112, 113 or causes it to reduce the bit for the output-specified sector information of the sectors following the sector containing the data of NV_PCK equal to 0. Therefore, with such an optical disk apparatus 100, the processing operation of the system controller 121 required for fast reproduction of only an I picture is complex and cumbersome to consequently lower the data access speed.

In view of the above described circumstances, it is therefore the object of the present invention to provide a data reproduction apparatus and a data reproduction method that can alleviate the workload of a special processing operation of fast forward or reverse data reproduction and improve the data access speed for fast reproduction of data.

BRIEF SUMMARY OF THE INVENTION

According to the invention, the above object is achieved by providing a data reproduction apparatus comprising:
  a reproduction means for reproducing a data stored in a recording medium;
  a first data information detection means for detecting a first piece of data information proving the rightness or wrongness of reproducing the data as signal, using the address information of the data reproduced by said reproduction means;
  a memory means for storing the data;
  an error correction means for performing an error detecting/error correcting operation on each of the data proved for the rightness of being reproduced as signal by said first piece of data information and storing the data back in said memory means after the error correcting operation;
  a second data information detection means for detecting a second piece of data information indicating a data to be reproduced as signal among the data subjected to the error correcting operation of said error correction means;
  a decoding means for decoding the data subjected to the error correcting operation of said error correction means and stored back in said memory means as reproduced signal;
  a control means for controlling the data output from said memory means to said decoding means by referring to the first piece of data information detected by said first data information detection means and the second piece of data information detected by said second data information detection means.

With a data reproduction apparatus according to the invention and having the above described configuration, the control means controls the entire operation of the apparatus in such a way that the first data information detection means generates a first piece of data information, using data that have not been subjected to an error correcting operation and the second data information detection means generates a second piece of data information, using the data specified by the first piece of data information so as to become a signal to be reproduced in order to decode the data specified by the second piece of data information so as to become a signal to be reproduced.

In another aspect of the invention, there is provided a data reproduction method comprising:
  reproducing a data stored in a recording medium;
  detecting a first piece of data information proving the rightness or wrongness of reproducing the data as signal by using the address information of the data reproduced by said reproduction means;
  performing an error detecting/error correcting operation on each of the data proved for the rightness of being reproduced as signal by said first piece of data information;
  detecting a second piece of data information indicating a data to be reproduced as signal among the data subjected to the error correcting operation;
  reproducing the data to be decoded under control by referring to the first piece of data information and the second piece of data information.

With a data reproduction method according to the invention as described above, a first piece of data information is generated by using data that have not been subjected to an error correcting operation and a second piece of data information is generated by using the data specified by the first piece of data information so as to become a signal to be reproduced in order to decode and reproduce the data specified by the second piece of data information so as to become a signal to be reproduced.

As described above, with a data reproduction apparatus according to the invention, the amount of data to be processed by the apparatus can be significantly reduced if compared with any conventional apparatus adapted to generate data information for data reproduction only prior to error correction so that the data access speed for fast reproduction of data can be remarkably improved even in the case of a special processing operation of fast forward or reverse data reproduction.

With a data reproduction method according to the invention, again, the amount of data to be processed can be significantly reduced if compared with any conventional methods adapted to generate data information for data reproduction only prior to error correction so that the data access speed for fast reproduction of data can be remarkably improved even in the case of a special processing operation of fast forward or reverse data reproduction.

BRIEF DESCRIPTION OF THE SEVERAL VIEWS OF THE DRAWING

FIG. 9 is still another schematic illustration of the data format of DVD;

FIG. 10 is a schematic illustration of a data format of the PCI contained in a NAVI pack;

FIG. 11 is a schematic illustration of another data format of the PCI contained in a NAVI pack;

FIG. 17 is a schematic illustration of a first sector information and a second sector information that may be generated by the and the stream detector circuit of an optical disk reproduction apparatus realized by applying the present invention;

FIG. 18 is another schematic illustration of a first sector information and a second sector information that may be generated by the and the stream detector circuit of an optical disk reproduction apparatus realized by applying the present invention; and FIG. 19 is a schematic illustration of an operation of fast reproduction conducted in an optical disk reproduction apparatus realized by applying the present invention.

DETAILED DESCRIPTION OF THE INVENTION

Now, the present invention will be described in greater detail by referring to the accompanying drawings that illustrate preferred embodiments of the invention.

Figure 1:
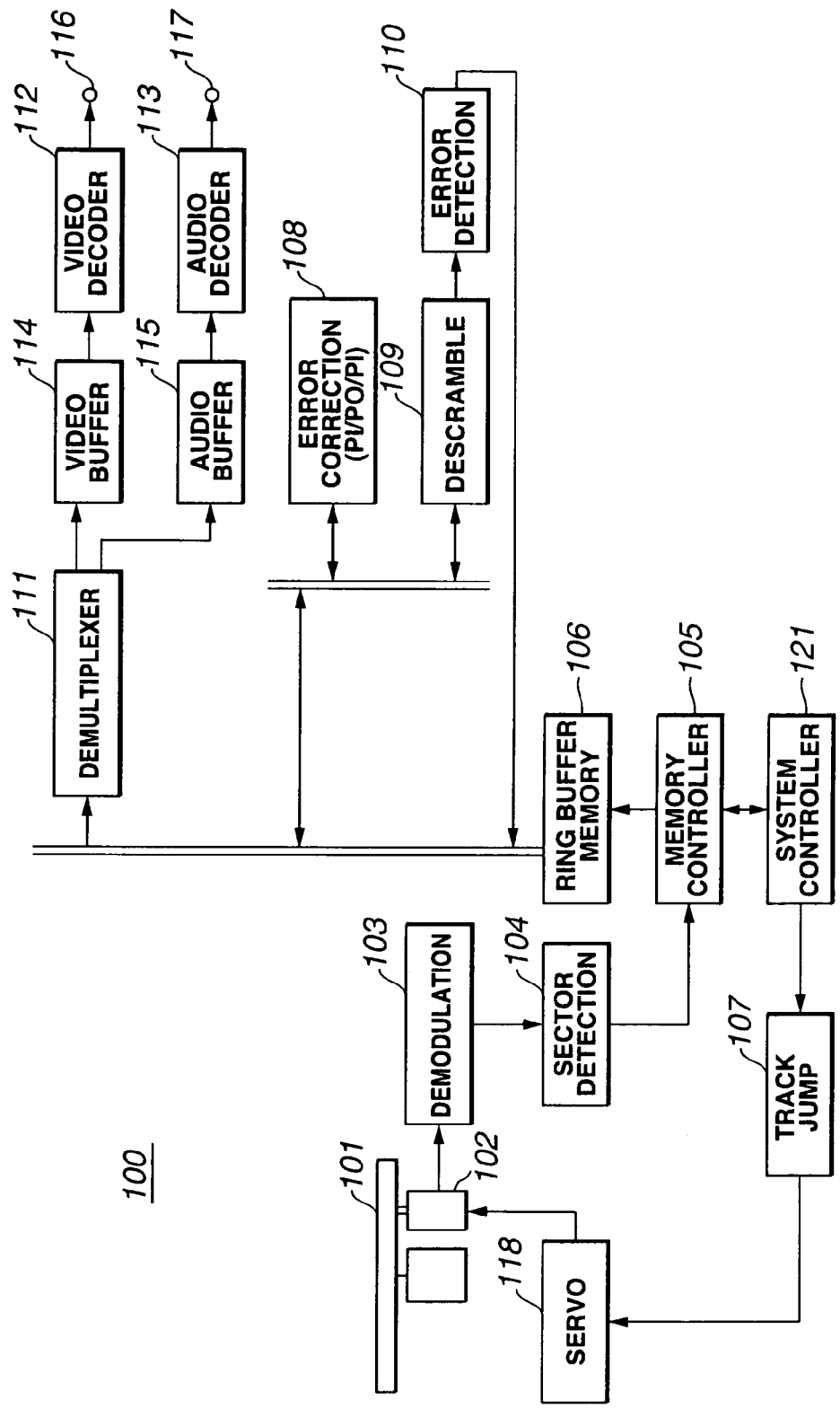
FIG. 1 is a schematic block diagram of a known optical disk apparatus.
Figure 2:
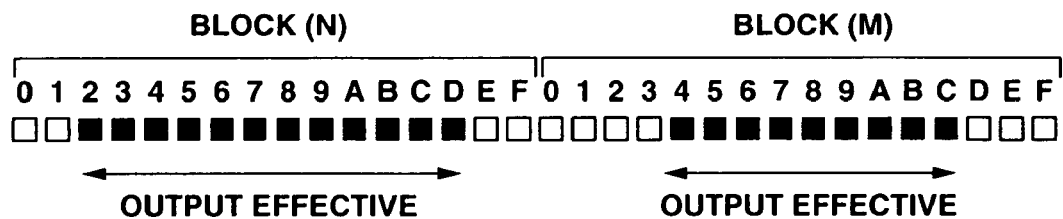
FIG. 2 is a schematic illustration of a processing operation of reproducing data by means of the known optical disk apparatus of FIG. 1.
Figure 3:
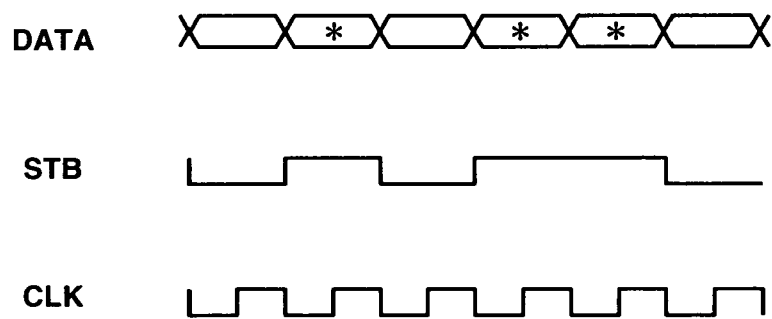
FIG. 3 is a timing chart for a processing operation of reproducing data from the known optical disk apparatus of FIG. 1.
Figure 4:
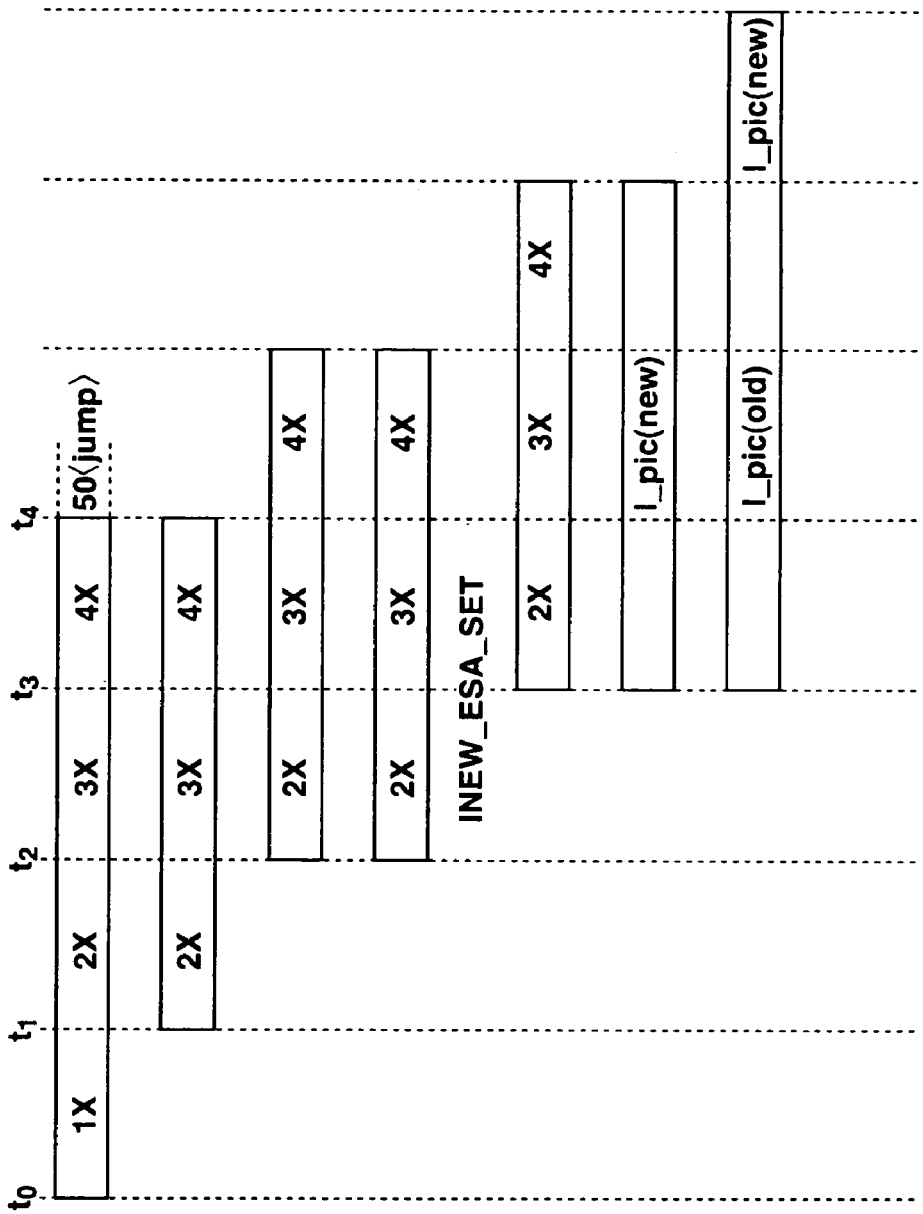
FIG. 4 is a schematic illustration of a processing operation of fast reproducing of only I pictures by meas of the known optical disk apparatus of FIG. 1.
Figure 5:
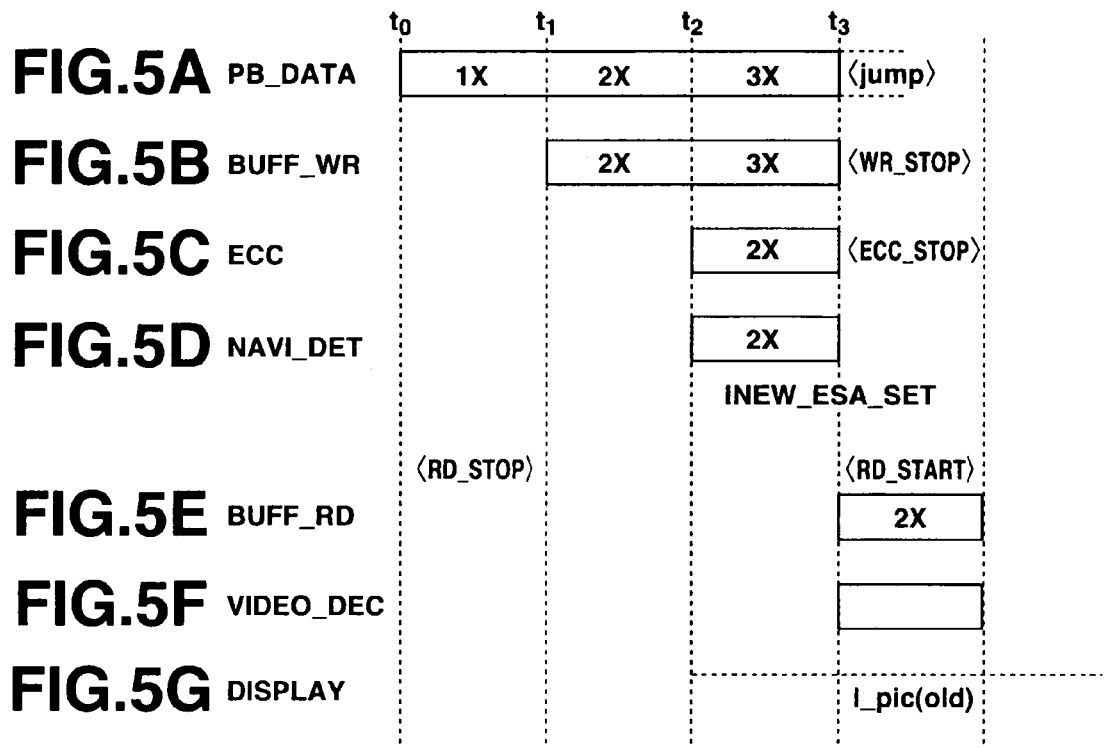
FIG. 5 is a schematic illustration of another processing operation of fast reproducing of only I pictures by means of the known optical disk apparatus of FIG. 1.
Figure 6:
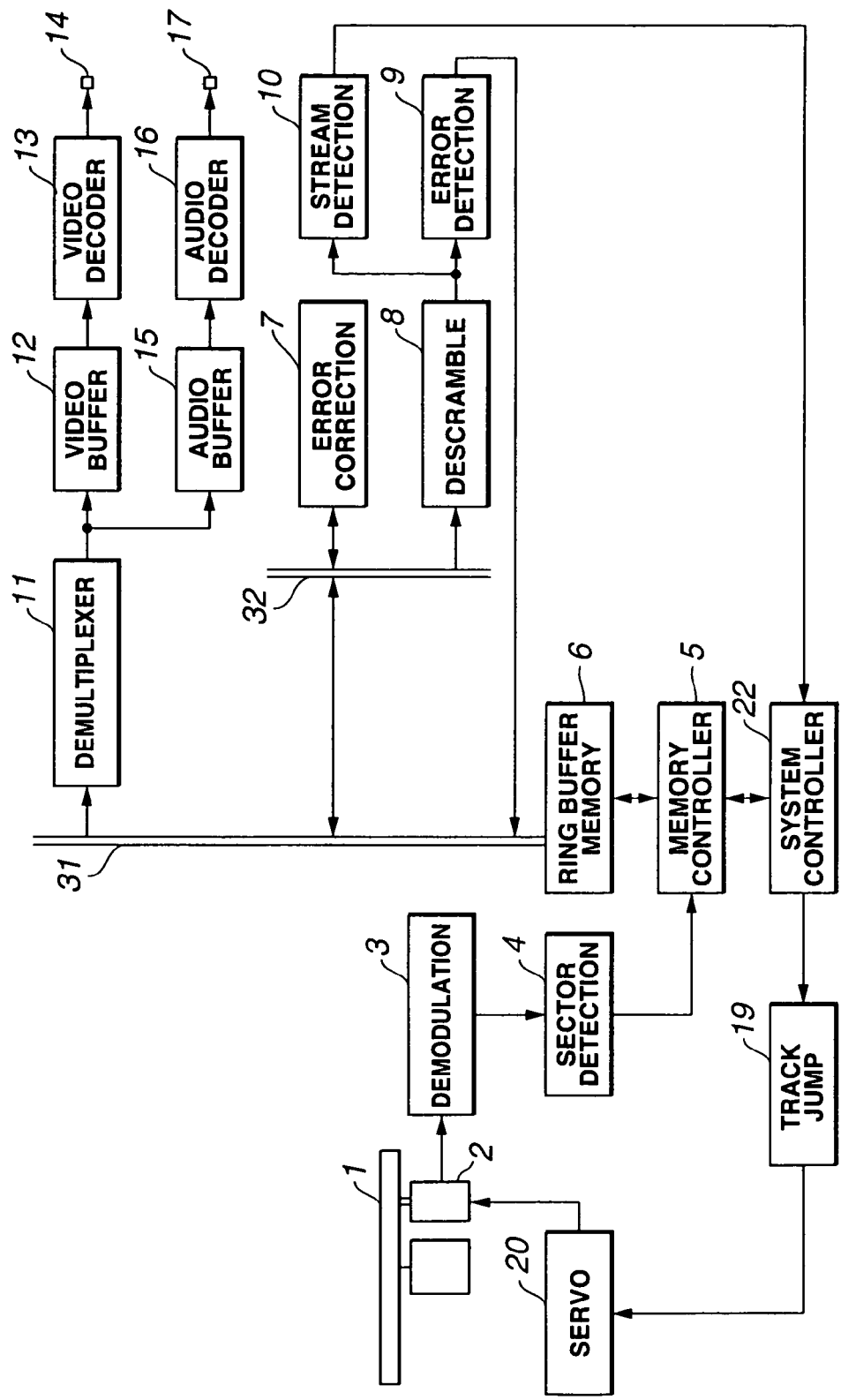
FIG. 6 is a schematic block diagram of an optical disk reproduction apparatus realized by applying the present invention.

The present invention can typically be applied to an optical disk reproduction apparatus having a configuration as illustrated in FIG. 6.

Referring to FIG. 6, the optical disk reproduction apparatus is adapted to mount an optical disk 1 (DVD: digital video disk) that can store a large volume of data by using a laser beam having a long wavelength and an objective lens having a large numerical aperture. In the following description, it is assumed that video data and audio data conforming to the MPEG (Moving Picture Experts Group) Standards are recorded on the optical disk 1 in the DVD format.

Figure 7:
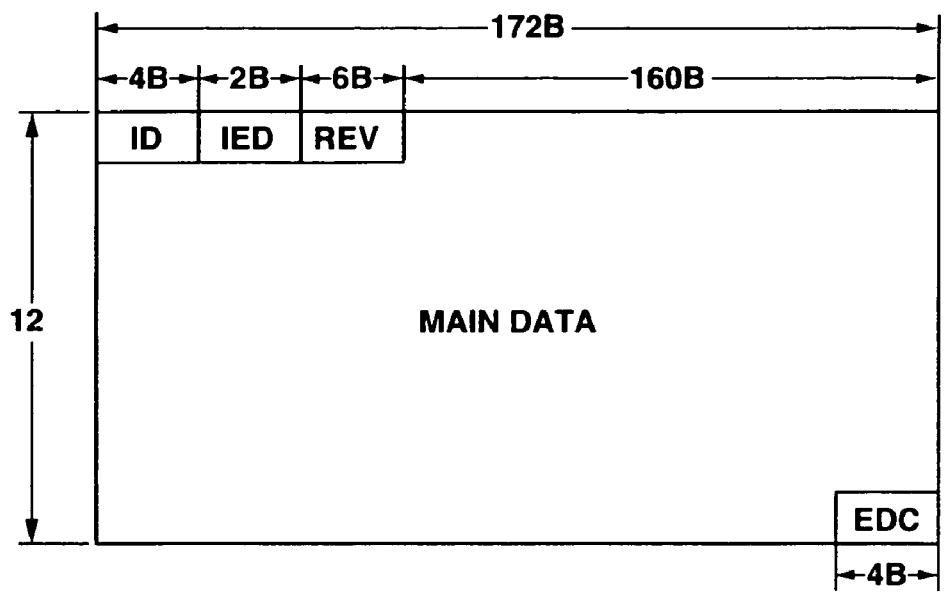
FIG. 7 is a schematic illustration of the data format of DVD.
Figure 8:
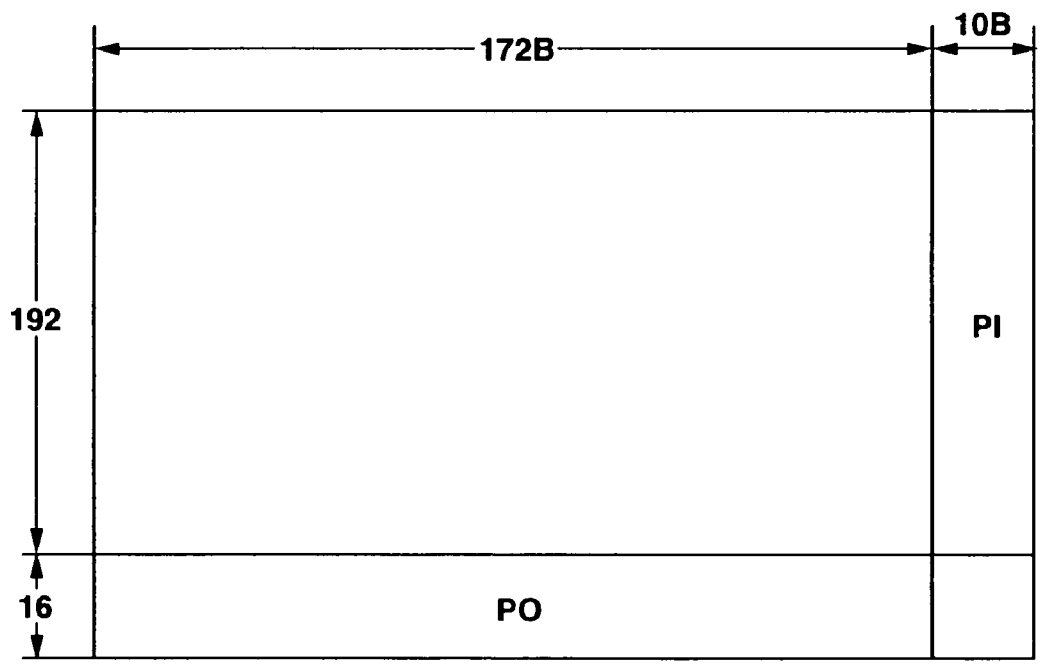
FIG. 8 is another schematic illustration of the data format of DVD.

The data of a sector recorded on the optical disk 1 comprises 12 rows×172 bytes as shown in FIG. 7. An ID of 4 bytes showing a physical address is arranged at the top of the sector and followed by a parity (IED) of 2 bytes and then by a reserve data (RSV) of 6 bytes. The main data of 2,048 bytes follows the reserve data (RSV). An error detection code (EDC) of 4 bytes is added to the tail end of the sector. As shown in FIG. 8, a total of 16 sectors of data, each containing 12 rows×172 bytes, are put together and arranged two-dimensionally in the form of (192 rows×172 bytes) to provide an ECC (error correction codes) block. Parity codes PI that are internal codes of 10 bytes ((182, 172, 11) Reed-Solomon code) are added to the data of (192 rows×172 bytes) along the column direction while parity codes PO that are external codes of 16 rows ((208, 192, 17) Reed-Solomon code) are added to them along the column direction.

The data provided with error-correcting codes are interleaved in such a way that all the rows are provided with one of the parity codes PO of 16 rows. Then, SYNCs are added to the interleaves data to show predetermined respective patterns and the data are subjected to 8-16 modulation (EFM) before they are recorded on the optical disk 1. Thus, the data of a sector recorded on the optical disk 1 show a physical structure as shown in FIG. 9. Since the data to be recorded on the optical disk 1 are subjected to 8-16 modulation, 1456 bits correspond to 91 bytes. In FIG. 9, SY0, SY1, SY2, . . . denotes the respective SYNC patterns.

Now the configuration of a NAVI pack conforming to the DVD format that is referred to when reproducing data by an optical disk reproduction apparatus will be discussed below.

In the DVD format that defines the structure of the data to be recorded on a DVD, a cell is defined as basic unit to be used for reproducing the data contents. A cell comprises a reproduction unit of 0.4 to 1.2 seconds that is referred to as video object unit (VOBU) and operates as the smallest unit for data reproduction. Thus, data are reproduced on the basis of VOBU.

A navigation pack (NV_PCK) that is a control information pack is arranged at the top of each VOBU. The NV_PCK contains presentation control information (PCI) and data search information (DSI). PCI and DSI are used as address information of the VOBU operating as the smallest unit for data reproduction in order to scan the front and the back of the VOBU typically when data are reproduced at high speed.

Note that the data of a NAVI pack has to be taken out of the data of the sector that has been confirmed for non-existence of error by replaying the optical disk 1, correcting the errors in the reproduced data, descrambling the data and detecting errors.

As shown in (a) of FIG. 10 and (a) of FIG. 11, an NV_PCK contains a PCI (presentation control information) packet containing information for controlling the display of picture data and a DSI (data search information) packet containing information for searching each data.

The PCI of an NV_PCK includes administrative information (PCI_GI: general information), angle switch information for non-seamless (NSML_AGLI: angle information for non-seamless), information, if relevant, for highlighting and displaying a sub-video signal in a predetermined area and recording information (RECI) for main-video data, sub-video data and audio data.

Particularly, as shown in (c) of FIG. 10, PCI_GI includes NV_PCK_LBN showing the sector address of the NAVI pack, VOBU_CAT, VOBU_UOP_CTL, VOBU_S_PTM, VOBU_E_PTM, VOBU_SE_E_PTM and C_ELTM.

NV_PCK_LBN indicates the address (LBN) of the NV_PCK. VOBU_CAT indicate the category of the VOBU. VOBU_UOP_CTL shows the control information of the user operation. VOBU_S_PTM indicates the start time for displaying the first GOP in the VOBU. VOBU_E_PTM indicates the end time of displaying the last GOP in the VOBU. VOBU_SE_E_PTM indicates that the video data is discontinued in the VOBU. C_ELTM shows the elapsed time from the top of the Cell containing the VOBU. Thus, with this optical disk reproduction apparatus, the elapsed time is displayed according to C_ELTM.

As shown in (b) of FIG. 11, the DSI of an NV_PCK includes general administrative information of the DSI (DSI_GI: general information), control information for seamless playback (SML_PBI: seamless playback information), angle information for seamless playback (SML_AGLI), VOBU search information (VOBU_SRI) indicating the time interval of consecutive VOBUs and synchronous information (SYICI) indicating the synchronism of the audio data and the sub-video data.

Particularly, as shown in (c) of FIG. 11, DSI_GI includes NV_PCK_SCR, NV_PCK_LBN, VOBU_EA, VOBU_1STREF_EA, VOBU_2NDREF_EA, VOBU_3RDREF_EA, VOBU_VOB_IDN, VOBU_C_IDN and C_ELTM.

NV_PCK_SCR indicates the scale of the system clock. NV_PCK_LBN indicates the sector address of NV_PCK. VOBU_EA indicates the end address of VOBU. VOBU_1STREF_EA indicates the end address of the first I picture. If there is no I picture in VOBU, the data of VOBU_1STREF_EA is equal to 0. VOBU_2NDREF_EA indicates the end address of the second I picture or P picture. If there are no two I pictures or P pictures in VOBU, the data of VOBU_2NDREF_EA is equal to 0. VOBU 3RDREF_EA indicates the end address of the third I picture or P picture. If there are no three I pictures or P pictures in VOBU, the data of VOBU_3RDREF_EA is equal to 0. VOBU_VOB_IDN indicates the ID number of this VOBU. VOBU_C_IDN indicates the ID number of the Cell containing this VOBU. C_ELTM indicates the elapsed time from the top of the Cell containing this VOBU.

As the system controller 22 obtain an NV_PCK having a configuration as described above, it determines how many I pictures or P pictures in the VOBU that is stored in the ring buffer memory 6 contains. More specifically, the system controller 22 determines the number of I pictures or P pictures contained in the VOBU by detecting the information indicated by the VOBU_1STREF_EA, VOBU_2NDREF_EA and VOBU_3RDREF_EA. Firstly, the system controller 22 determines that the number of I pictures or P pictures is not less than three if the data of VOBU_3RDREF_EA is not equal to 0. Secondly, the system controller 22 determines that the number of I pictures or P pictures is equal to two if the data of VOBU_3RDREF_EA is equal to 0 and the data of VOBU_2NDREF_EA is not equal to 0. Thirdly, the system controller 22 determines that there is an I picture if both the data of VOBU_3RDREF_EA and that of VOBU_2NDREF_EA are equal to 0 and the data of VOBU_1STREF_EA is not equal to 0. The system controller 22 determines that there is no I picture nor P picture in any other case.

The optical disk reproduction apparatus as shown in FIG. 6 comprises an optical pickup 2 for reading signals recorded on an optical disk 1. The optical pickup 2 by turn comprises an optical system including an objective lens and a photodetector and is adapted to read a signal recorded on the optical disk 1 by detecting that changes in the light that occur according to the signal. The optical pickup 2 then output the signal it reads to demodulator 3.

The demodulator 3 demodulates the signal from the optical pickup 2. More specifically, the demodulator 3 carriers out a processing operation of 8-16 modulation (which is referred to as EFM (eight fourteen modulation) plus) of converting the signal formed on the basis of the unit of 8 bits into a 16-bit data pattern by referring to a predetermined conversion table to generate a data and output it to sector detector 4.

The sector detector 4 generates a first piece of sector information on the data demodulated by the demodulator 3. More specifically, the sector detector 4 generates a first piece of sector information by detecting sync patterns SY0, SY1, SY2, . . . in the data and then sector address numbers corresponding to the respective addresses assigned to the sectors of the optical disk. The first piece of sector information generated by the sector detector 4 includes start sector information showing the start address of each sector, end sector information showing the end address of each sector and output-specified sector information indicating the sector from which the data contained therein is reproduced. Then, the sector detector 4 outputs the data from the demodulator 3 and the first piece of sector information to the memory controller 5. Said first piece of sector information is expressed as 1-bit data and written into a predetermined area of the ring buffer memory 6.

Additionally, the sector detector 4 outputs a sector address number abnormal signal to the system controller 22 if it cannot detects any sector address number or, if it can, the detected address numbers are not consecutive.

Upon receiving the data and the first piece of sector information from the sector detector 4, the memory controller 5 operates according to the control signal from the system controller 22 and controls the data input to and output from the downstream ring buffer memory 6.

The memory controller 5 reads out the address of the input data and specifies the write address (write pointer WP) where the ring buffer memory 6 stores the data according to the read out address.

Additionally, the memory controller 5 judges if the amount of data stored in the ring buffer memory 6 exceeds the capacity of an ECC block or not and specifies the address of the ring buffer memory 6 from which the data is read to the downstream error correction circuit 7 and the address (ECC end pointer EP) of the ring buffer memory 6 at which the data that has been subjected to error correction is stored.

Still additionally, the memory controller 5 specifies the address (output pointer RP) of the ring buffer memory 6 from which the data is read out according to the code request signals from the video decoder 13 and the audio decoder 16 located downstream. At this time, the memory controller 5 refers to the first piece of sector information and the second piece of sector information for each of the sectors generated by the sector detector 4 and the stream detector 10 and determines for each of the sectors if the data of the sector is to be output from the ring buffer memory 6 to the demultiplexer 11 by way of the data bus 31 or not. Then, it generates a data strobe signal for specifying the data to be output from the ring buffer memory 6 to the demultiplexer 11.

The ring buffer memory 6 has a ring-shaped address structure so that the address returns to the top when it gets to the tail end and the operation of inputting data into and outputting data from it is controlled by the memory controller 5. The ring buffer memory 6 stores the data from the memory controller 5, the first piece of sector information, the data corrected for errors and the second piece of sector information which will be described hereinafter. The ring buffer memory 6 outputs data to the error correction circuit 7 or the descramble circuit 8 by way of the data bus 32 and the data subjected to error correction to the demultiplexer 11 by way of the data bus 31 under the control of the memory controller 5. The specific configuration of the ring buffer memory 6 will be described in greater detail hereinafter.

The error correction circuit 7 reads out data on the basis of the unit of an ECC block from the ring buffer memory 6 and detects and corrects errors, using the parity bits (parity data) added to the data. At this time, the error correction circuit 7 corrects errors for the PI system and the PO system. If the error correction circuit 7 cannot correct errors, it outputs an error occurrence signal to the ring buffer memory 6 and also to the system controller 22 by way of the memory controller 5. The error correction circuit 7 outputs the data corrected for errors to the ring buffer memory 6 by way of the data bus.

The descramble circuit 8 receives the data corrected for errors from the ring buffer memory 6, descrambles it and outputs the descrambled data to the error detector 9 and the stream detector 10. Note that a descramble operation is an operation of obtaining the exclusive OR of the scrambled data generated by using the value selected by means of the least significant 7 to 4 bits of the physical address and the main data.

The error detector 9 performs an error detecting operation of determining if there exists an error or not by carrying out a parity operation on the error detection codes (EDCs), using the data from the descramble circuit 8. If the error detector 9 determines that the data of a sector of the ECC block contains one or more than one errors, it generates a result-of-correction flag having an outstanding "1" bit for the sector. The error detector 9 outputs the result-of-the-correction to the ring buffer memory 6 by way of the data bus 32 for each sector.

The stream detector 10 generates a second piece of sector information on the basis of the data from the descrabmle circuit 8. For the data of each sector, it generates NAVI sector information having an outstanding "1" bit when it judges that the data of the sector corresponds to an NAVI pack which will be described hereinafter and a second piece of sector information comprising IP output sector information having an outstanding "1" bit when it judges the data of the sector corresponds to an I picture (IP).

The stream detector 10 makes the bit on said NAVI sector information equal to "1" when it judges that the data of each sector from the descramble circuit 8 is that of a NAVI pack and equal to "0" when it judges that the data is not hat of a NAVI pack.

The stream detector 10 is provided with an IP counter adapted to count up for each sector. The IP counter loads "0" at each sector where the bit for the start sector information of the first piece of sector information is "1", the result-of-correction flag of the second piece of information is "0" (no error) and the bit for the NAVI sector information is "1" and does not count up when the sector address number of the IP end address requested by VOBU_*REF_EA and the count value agree with each other whereas it counts up when the sector address number of the IP end address and the count value do not agree with each other.

The stream detector 10 makes the bit for the IP output sector information of the second piece of sector information equal to "1" for each sector where the bit for the start sector information is "1" and the bit for the NAVI sector information is "1" or where the IP end address and the count value of the IP counter do not agree with each other. However, the stream detector 10 makes the bit for the IP output sector information of the second piece of sector information equal to "0" for all the sectors that do not satisfy the above requirements.

Additionally, the stream detector 10 outputs an IP output end detector signal to the system controller 22 at the timing when the operation of error correction and error detection is completed for all the 16 sectors of the ECC block including the sectors where the IP end address and the count value of the IP counter agree with each other.

Then, the stream detector 10 outputs the second piece of sector information comprising the NAVI sector information, the IP output sector information and the result-of-correction flag to the system controller 22. The second piece of sector information is expressed in the form of 1-bit data and written into a predetermined area of the ring buffer memory 6 with said first piece of sector information.

The demultiplexer 11 is connected to the data bus 31 and data are input to it from the ring buffer memory 6 by way of the data bus 31. The demultiplexer 11 separates video data and audio data by referring to the header information indicating video data and audio data that is contained in the packed data and outputs the video data and the audio data that are separated from each other respectively to the video buffer 12 and the audio buffer 15.

The video buffer 12 temporarily stores the video data from the demultiplexer 11 and outputs it to the video decoder 13 at a predetermined timing.

The video decoder 13 receives video data from the video buffer 12 on the basis of the VOBU unit and decodes the data that is compressed according to a system typically conforming to the MPEG 2 Standards. The video decoder 13 typically comprises an inverse VLC (variable length coding) circuit, an inverse detection (Discrete Cosine Transform) circuit, an inverse quantization circuit and a motion compensation circuit.

Of the above listed circuits, the inverse VLC circuit performs an inverse VLC processing operation on the input video data. When the inverse VLC processing operation is completed for the input data, it outputs the data to the inverse quantization circuit and also a code request signal containing an instruction for causing the video buffer 12 to output a video data to the video decoder 13 in order to obtain a new video data.

The inverse quantization circuit performs an inverse quantization processing operation on the input video data according to the quantization step size supplied from the inverse VLC circuit and outputs the data to the inverse DCT circuit. The inverse DCT circuit then performs an inverse DCT processing operation on the input data and outputs the data to the adder. The data supplied to the adder from the inverse DCT circuit is output to the frame memory from the adder without being processed if it is a data on an I (intra) picture.

If, on the other hand, the data supplied to the adder from the inverse DCT circuit is a data on a P (predictive) picture obtained by using an I picture, the video decoder 13 reads out the data on the decoded I picture from the frame memory and causes the motion compensation circuit to perform a processing operation of motion compensation that corresponds to the motion vector supplied from the inverse VLC circuit on the data from the frame memory. Then, it adds the data output from the inverse DCT circuit and the data processed for motion compensation to prepare a P picture data, which is then stored in the frame memory.

Furthermore, if the data supplied to the adder from the inverse DCT circuit is a data on a B (bidirectionally predictive) picture, the video decoder 13 reads out the data on the decoded I picture or P picture from the frame memory and causes the motion compensation circuit to perform a processing operation of motion compensation. Then, it adds the data from the inverse DCT circuit and the data processed for motion compensation to prepare a B picture data, which is then stored in the frame memory.

Additionally, the video decoder 13 generates a video signal by D/A converting the decoded video data by means of a D/A converter and outputs the video signal to the outside by way of output terminal 14.

The audio buffer 15 temporarily stores the audio data from the demultiplexer 11 and outputs it to the audio decoder 16 at a predetermined timing.

The audio decoder 16 generates an audio signal by decoding the audio data encoded into a predetermined coding format and D/A converting it. Then, it outputs the audio signal to the outside by way of output terminal 17.

The track jump control circuit 19 generates a track jump signal for moving the optical pickup 2 to a track formed on the optical disk according to the control signal from the system controller 22 and outputs it to the servo circuit 20.

The servo circuit 20 causes the optical pickup 2 to track jump by generating a drive signal for driving the optical pickup 2 according to the track jump signal from the track jump control circuit 19 and supplying the drive signal to the motor for driving the optical pickup 2.

Now, the operation of the ring buffer memory 6 provided in the optical disk reproduction apparatus will be described below.

Figure 12:
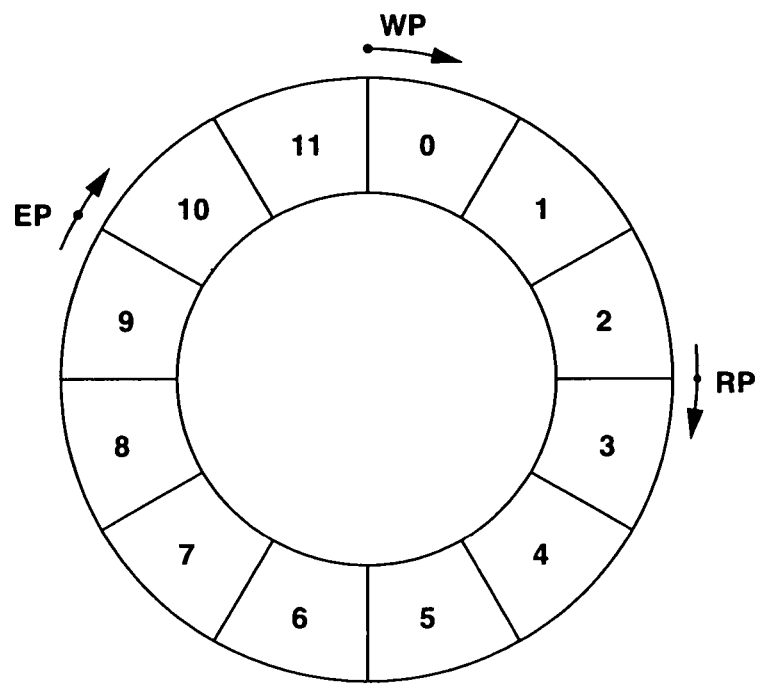
FIG. 12 is a schematic illustration of the address structure of the ring buffer memory of an optical disk reproduction apparatus realized by applying the present invention.

As shown in FIG. 12, the ring buffer memory 6 has a ring-shaped address structure so that the address returns to the top when it gets to the tail end. Referring to FIG. 12, if the address (X) (X: address number) is made to take any of address "0" through address "11", the address sequentially proceeds from address (0) to address (1), address (2), . . . until it gets to address (11), when it returns to address (0) and again sequentially proceeds to address (1), address (2), . . . . Such a ring buffer memory 6 is made to operate on a FIFO basis.

In FIG. 12, WP denotes the write pointer that indicates the address where a write operation has just been completed. In FIG. 12, EP denotes the ECC end pointer that indicates the address where an processing operation of error correction has just been completed. In FIG. 12, RP denotes the read pointer that indicates the address where a read operation has just been completed.

Figure 13:
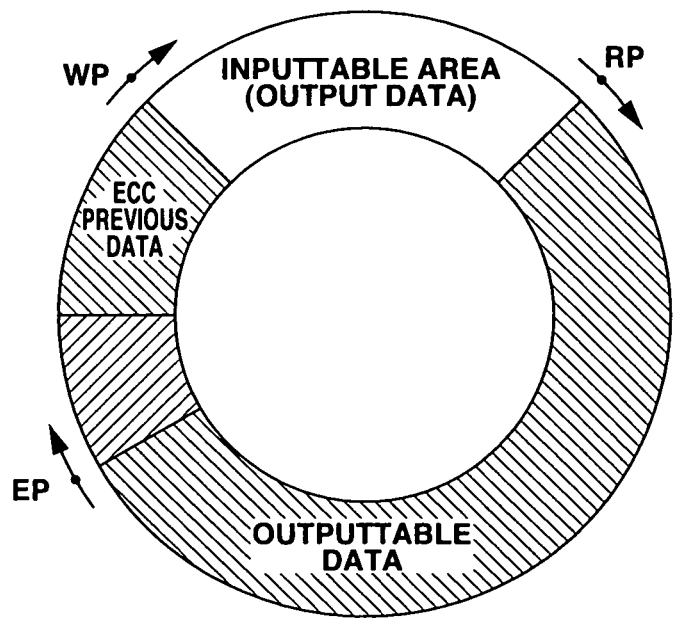
FIG. 13 is a schematic illustration of the data structure of the ring buffer memory of an optical disk reproduction apparatus realized by applying the present invention.

In the case of FIG. 13, where the write pointer WP is located at address (11), data have been written to address (11). The ECC end pointer is, on the other hand, located at address (9) in FIG. 13 so that a processing operation of error correction has just been completed at address (9). Finally, the read pointer RP is located at address (2) in FIG. 13 so that the data has been read down to address (2). Thus, a processing operation of error correction has been completed at addresses (3) through (9) and readable data are located there, whereas data that have been read and are no longer needed are located at addresses (0) through (2) and newly written data are located at address (10) and address (11).

Figure 14:
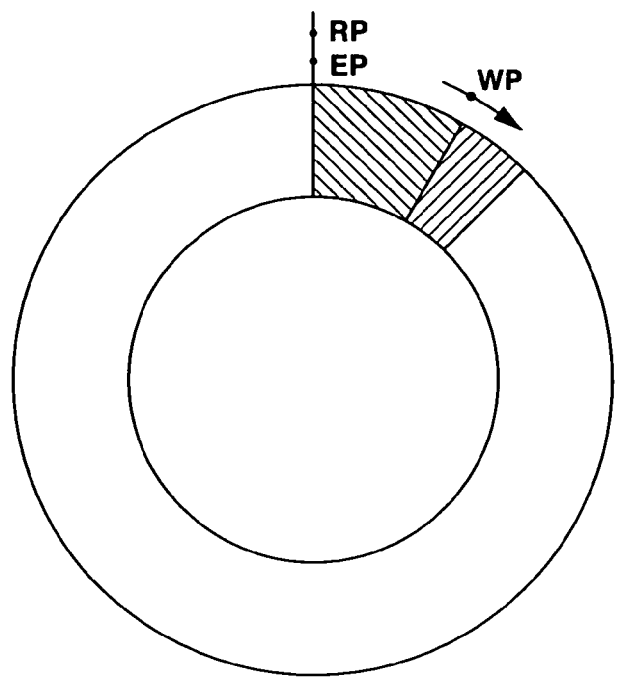
FIG. 14 is a schematic illustration of the pointers of the ring buffer memory of an optical disk reproduction apparatus realized by applying the present invention.
Figure 15:
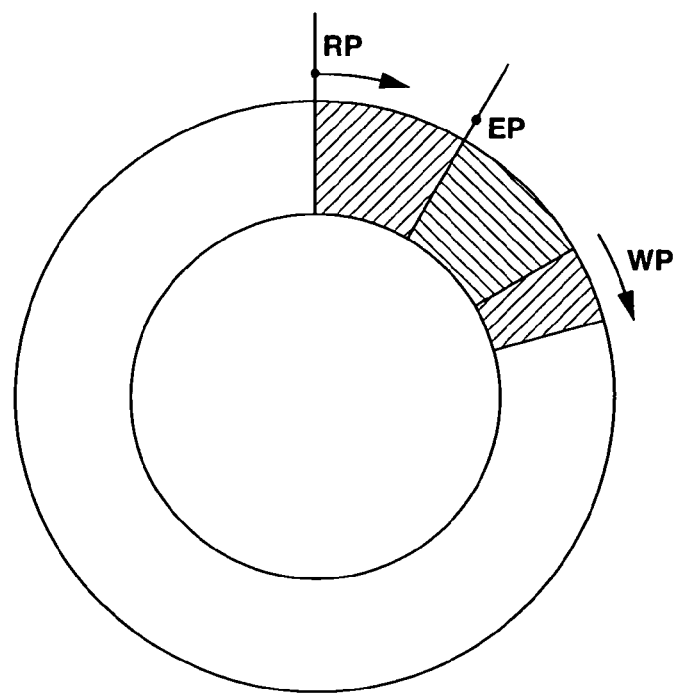
FIG. 15 is another schematic illustration of the pointers of the ring buffer memory of an optical disk reproduction apparatus realized by applying the present invention.
Figure 16:
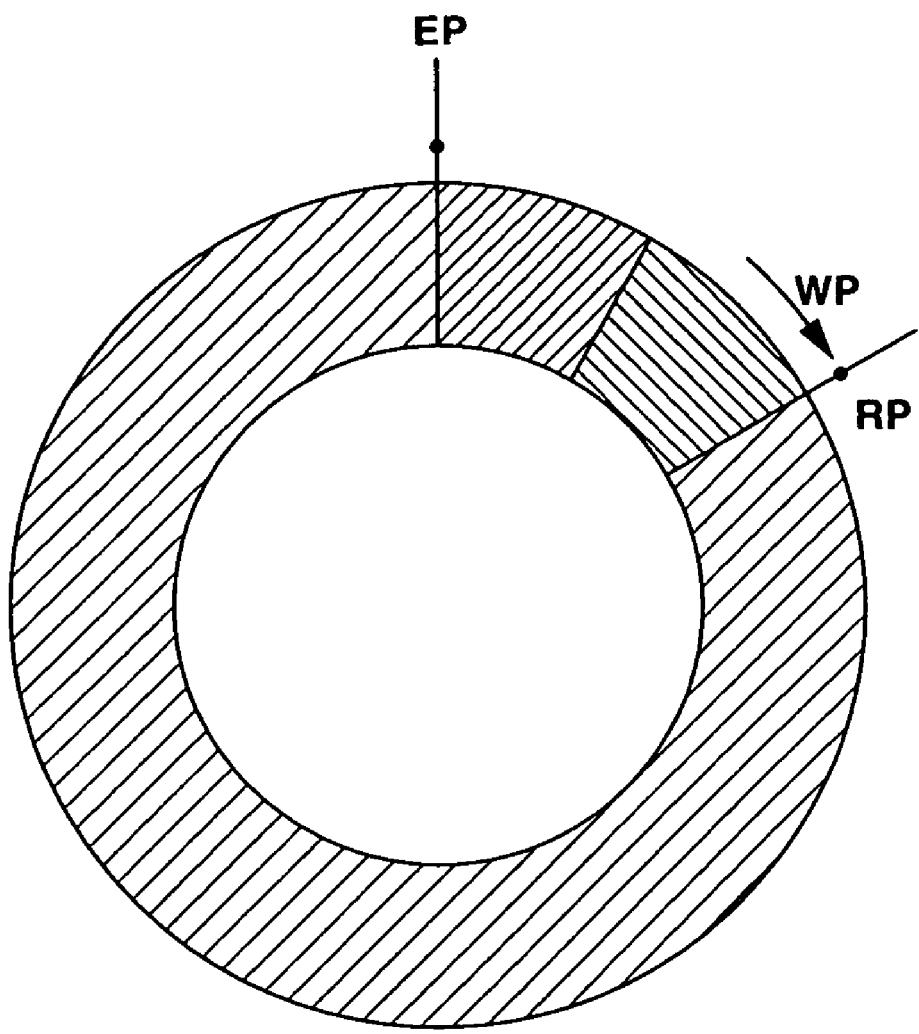
FIG. 16 is still another schematic illustration of the pointers of the ring buffer memory of an optical disk reproduction apparatus realized by applying the present invention.

More specifically, each of the pointers move in the ring buffer memory 6 in a manner as illustrated in FIGS. 14 through 16.

Assume here that data to be corrected for errors are written down to the position of the write pointer WP. The data to be corrected for errors are then corrected for errors by the error correction circuit 7 and sent to the ring buffer memory 6. Therefore, the data down to the position of the error pointer EP are those that have been corrected for errors and are ready to be output. Data have been actually read out down to the position of the read pointer RP.

Then, as shown in FIG. 14, firstly demodulated data are written into the ring buffer memory 6. As the operation of writing data is completed, the write pointer WP is made to advance by an ECC block and the data of the block are transferred to the error correction circuit 7 and corrected for errors in terms of the PI system, the PO system and the PI system. When the operation of error correction is completed, the data are subjected to a processing operation of descrambling and that of error detection. Then, the data corrected for errors are transferred to the ring buffer memory 6 and, when the data of the block is completed, the error pointer EP is made to advance by an I block.

Referring to FIG. 15, the data corrected for errors are ready to be output. Upon receiving an output request signal, the data are read out of the ring buffer memory 6 and the write pointer RP is made to advance. At this time, it is determined if there are data ready to be output on the basis of the read pointer RP and the error pointer EP. In other words, the relationship between the error pointer EP and the read pointer RP is determined. If the relationship between the error pointer EP and the read pointer RP is expressed by EP>RP, it indicates that there are data ready to be output so that the data are output to the downstream and the read pointer is made to advance. If EP=RP, it indicates that there are no data ready to be output so that no data will be actually output.

If there is no data output request from a downstream circuit as shown in FIG. 16, while the write pointer WP is made to advance, the read pointer RP remains unmoved so that the write pointer WP eventually catches up the read pointer RP. When the write pointer WP catches up the read pointer RP to establish a relationship of EP=RP, the write operation is temporarily suspended. However, a track jump can be made whenever necessary (overflow control). Thereafter, when the write pointer RP is made to advance and an area where data can be input is produced, demodulated data will be written there.

As described above, with the optical disk reproduction apparatus, the memory controller 5 controls the ring buffer memory 6 in such a way that the read pointer RP may not outrun the ECC end pointer EP, that the ECC end pointer EP may not outrun the write pointer WP and that, when the write pointer catches up the read pointer RP, the operation of writing data may be suspended.

Now, the operation of the system controller 22 for reproducing the data recorded on the optical disk 1 by the optical disk reproduction apparatus having the above described configuration will be discussed below.

The system controller 22 specifies the sector address number of the data to be written into the ring buffer memory 6 that operates in a manner as described above to the sector detector 4. For instance, the system controller 22 specifies the write start specifying address (SSA) that indicates the sector address number where the operation of writing data into the ring buffer memory 6 starts and the write end specifying address (ESA) that indicates the sector address number where the operation of writing data into the ring buffer memory 6 ends. When reproducing data stored in the optical disk 1, the system controller 22 causes the servo circuit 20 to output a track jump command by supplying the track jump control circuit 19 with the write start specifying address SSA. With this arrangement, the system controller 22 so controls the servo circuit 20 as to drive the optical pickup 2 and cause the latter to jump to the track position agreeing with the write start specifying address SSA.

The sector detector 4 detects the sector address number out of the data demodulated by the demodulator 3 and sends its output to the memory controller 5 by referring to the detected sector address number and the write start specifying address SSA. Then, the memory controller 5 reads out the address of each sector of the optical disk 1 from the output of the sector detector 4 and determines the agreement of each sector address number by comparing with the write start specifying address SSA and the write end specifying address ESA. Then, it writes the data on an ECC block basis into the ring buffer memory 6 with the write start specifying address SSA and the write end specifying address ESA. Additionally, the sector detector 4 generates a first piece of sector information and outputs it to the system controller 22 by way of the memory controller 5.

Then, the system controller 22 so controls the memory controller 5 as to cause the latter to perform processing operations of error correction, descrambling and error detection on the data written into the ring buffer memory 6 and, at the same time, inputs the second piece of sector information from the stream detector 10.

Then, the system controller 22 controls the memory controller 5 so as to cause the latter to write the first piece of sector information generated by said sector detector 4 and the second piece of sector information generates by the stream detector 10 in a predetermined area of the ring buffer memory 6. With this arrangement, the system controller 22 makes the bit 0, bit 1, bit 2, bit 3, bit 4 and bit 5 stored in the predetermined area to be used respectively as start sector information, end sector information, output-specified sector information, NAVI sector information, result-of-correction flag and IP output sector.

Thereafter, the system controller 22 so controls the memory controller 5 as to cause the latter to control the data output from the ring buffer memory 6 to the demultiplexer 11 according to the first piece of sector information and the second piece of sector information so that it reproduces the video data by way of the demultiplexer 11, the video buffer 12 and the video decoder 13 and the audio data by way of the demultiplexer 11, the audio buffer 15 and the audio decoder 16.

When decoding video data, the video data to be decoded are output from the ring buffer memory 6 to the video buffer 12 according to the code request signal generated by the video decoder of the optical disk reproduction apparatus. However, if operations for processing data on simple images are consecutively conducted so that the video decoder 13 consumes only a short time to decode the data, the volume of data transferred from the video buffer 12 to the video decoder 13 becomes reduced. Then, if the rate at which data are transferred to the demultiplexer 11 becomes lower than the rate at which data are written under the control of the memory controller 5, the ring buffer memory 6 can overflow because the amount of data to be stored in the ring buffer memory 6 increases. In view of this fact, if the amount of data currently stored in the ring buffer memory 22 exceeds a predetermined reference value as indicated by the control signal from the system controller 22 showing the amount of data of the ring buffer memory 22, the track jump controller circuit 19 determines that the ring buffer memory 6 can overflow and outputs a track jump signal to the servo circuit 20.

Additionally, upon receiving a sector abnormal signal from the sector detector 4 or an error occurrence signal from the error correction circuit 7, the system controller 22 determines the amount of outputtable data remaining in the ring buffer memory 6 on the basis of the ECC end pointer EP and the output pointer RP that are under the control of the memory controller 5 and, at the same time, the amount of data necessary for reading data from the ring buffer memory 6 to the video buffer 12 while the optical disk 1 makes a full turn (during the time waiting for a full turn of the optical disk 1). So long as the ring buffer memory 6 contains a large amount of date remaining in it, no underflow occurs in the ring buffer memory 6 if data are read out of it at a maximal transfer rate. Therefore, the system controller 22 judges that any error can be corrected by causing the optical pickup 2 to once again reproduce data from the position where the error occurred and so controls track jump control circuit 19 as to cause the latter to output a track jump command to the servo circuit 20.

Upon receiving the track jump signal output from the track jump control circuit 19, the servo circuit 20 causes the optical pickup 2 to make a track jump in order to shift the replay track position of the optical pickup 2. More specifically, if, for instance, data are recorded from the inner periphery toward the outer periphery of the optical disk 1, the servo circuit 20 causes the optical pickup 2 to jump from the current track position to the adjacent inner track. Then, in this optical disk reproduction apparatus, any new data write to the ring buffer memory 6 is prohibited until the optical pickup 2 makes a full turn and returns to the original track position and therefore until the sector address number obtained by the sector detector 4 becomes equal to the one obtained at the time of the track jump and, if necessary, the data already stored in the ring buffer memory 6 are output to the video buffer 12.

After the track jump, the track jump control circuit 19 does not resume the operation of writing data into the ring buffer memory 6 and makes another track jump take place if the sector address number obtained from the sector detector 4 agrees with the one obtained at the time of the track jump provided that the amount of data stored in the ring buffer memory 6 exceeds a predetermined reference value and hence the ring buffer memory 6 can overflow.

The ring buffer memory 6 has a memory capacity for storing at least the amount of data corresponding to a track (or a full turn) of the optical disk 1. Therefore, for instance, if the optical disk 1 is a CLV (constant line velocity) disk and hence the period of revolution is maximized at the outermost periphery, the ring buffer memory 6 has a memory capacity for storing at least the amount of data corresponding to the memory capacity of (a full turn) of the outermost track, or (the period of revolution at the outermost periphery)×(the data transfer rate from the error correction circuit 7 tot he ring buffer memory 6).

Additionally, in the optical disk reproduction apparatus, the maximum data transfer rate of transferring data from the ring buffer memory 6 to the video buffer 12 is so selected as to be equal to or smaller than the data transfer rate of transferring data from the error correction circuit 7 to the ring buffer= memory 6. With this arrangement of the optical disk reproduction apparatus, a code request signal requesting transfer of data from the video buffer 12 to the ring buffer memory 6 can be output to the servo circuit 20 at any time regardless of the track jump timing.

Now, an operation of reproducing only an I picture out of the data recorded in the optical disk 1 by the optical disk reproduction apparatus.

When reproducing the video data of an I picture recorded on the optical disk 1, the optical disk reproduction apparatus firstly generates a first piece of sector information and a second piece of sector information.

If, for instance, a command for fast reproduction of the video data of only an I picture is externally input, the system controller 22 so controls the track jump control circuit 19 as to reproduce the video data stored in the optical disk 1 by means of the optical pickup 2 according to the command. At this time, the system controller 22 outputs to the track jump control circuit 19 a control signal for causing the optical pickup 2 to make a track jump by specifying a write start specifying address (SSA) and a write end specifying address (ESA). Then, the servo circuit 20 drives the optical pickup 2 to make it jump to the track position as specified by the write start specifying address SSA. The optical pickup 2 detects the data recorded on the optical disk 1 and the demodulator 3 demodulates the detected data. Then, the demodulated data is input to the sector detector 4.

The sector detector 4 detects the sector address number out of the data demodulated by the demodulator 3 and outputs the data to the memory controller 5 by referring to the detected sector address number, the write start specifying address SSA and the write end specifying address ESA. More specifically, the sector detector 4 reads the address of each sector of the optical disk 1 from the output of the demodulator 3 and determines if the sector address number of each sector agree with the write start specifying address SSA or the write end specifying address ESA or not. Then, the sector detector 4 outputs the data of the sectors starting from the sector having the sector address number that agrees with the write start specifying address SSA and ends the output of data when it detects the sector having the sector address number that agrees with the write end specifying address ESA. The memory controller 5 writes the data from the sector detector 4 into the ring buffer memory 6 on an ECC block basis and, at the same time, the first piece of sector information in a predetermined area of the ring buffer memory 6.

Additionally, the sector detector 4 compares the sector address number of each sector with the write start specifying address SSA. Then, it generates a first piece of sector information by making the bit of the start sector information of a sector equal to "1" if the sector is detected to have a sector address number agreeing with the write start specifying address SSA, the bit of the end sector information of a sector equal to "1" if the sector is detected to have a sector address number agreeing with the write end specifying address ESA and all the bits of the output-specified sector information of the sectors having respective sector address numbers that are found between the write start specifying address SSA and the write end specifying address ESA.

Then, the system controller 22 controls the memory controller 5 in such a way that the ECC blocks containing one or more than one sectors whose bits of the output-specified sector information are equal to "1" are output from the ring buffer memory 6 to the error correction circuit 7. The data output from the ring buffer memory 6 are subjected to a processing operation of error correction, descrambled by the descrambling circuit 8 and then subjected to a processing operation of error detection before they are stored back in the ring buffer memory 6.

Thereafter, the system controller 22 controls the memory controller 5 in such a way that the data corrected and detected for errors and the first piece of sector information are output from the ring buffer memory 6 to the stream detector 10. The stream detector 10 determines if the data of each sector from the ring buffer memory 6 are those of a NAVI pack or not and, if they are those of a NAVI pack, it makes the bit for the NAVI sector information of the sector equal to "1". The stream detector 10 also determines if errors are found as a result of the error detection of the error detector 10 and makes the bit for the result-of-correction flag of any sector containing errors equal to "1". Additionally, the stream detector 10 determines if the bit for the output-specified sector information of the data specified by VOBU_*REF_EA (*: indefinite number) added to each VOBU is equal to "1" or not and, if the bit for the output-specified sector information of the data specified by VOBU_*REF_EA (*: indefinite number) added to each VOBU is determined to be equal to "1", it turns the bit for the IP output sector information to "1". Upon generating a second piece of sector information, the stream detector 10 outputs it to the system controller 22. The system controller 22 so controls the memory controller 5 so as to store the second piece of sector information from the stream detector 10 in the ring buffer memory 6.

When outputting data stored in the ring buffer memory 6 to the demultiplexer 11 for reproduction, the system controller 22 controls the memory controller 5 in such a way that the first and second pieces of sector information are read out before reading out the data and only the data of the sectors whose logical product of the output-specified sector information and the IP output sector information is equal to "1" are output to the video decoder 13 in order to reproduce the video data and the audio data.

In the case of fast reproduction using only I pictures and when it is determined that each and every VOBU stored in the ring buffer memory 6 does not contain any I picture nor P picture, the system controller 22 concludes that there is no video data in the VOBU and so controls the memory controller 5 as to supply only the data of the NV_PCK from the ring buffer memory 6 to the demultiplexer 11. In other words, since the video decoder 13 does not need to decode any data so long as there is no video data, the system controller 22 so controls the memory controller 5 as to make it supply only necessary administrative data from the ring buffer memory 6 to the video decoder 13.

With this arrangement, the system controller 22 controls the memory controller 5 in such a way that, when reproducing a VOBU containing an I picture, the I picture and the NAVI pack are output from the ring buffer memory 6 to the demultiplexer 11, whereas, when reproducing a VOBU containing no I picture, only the NAVI pack is output from the ring buffer memory 6 to the demultiplexer 11.

Now, the processing operation that is conducted by the sector detector 4 and the stream detector 10 of the above described optical disk reproduction apparatus to respectively generate a first piece of sector information and a second piece of sector information will be discussed by referring to FIG. 17.

FIG. 17 shows the state of the sector information bit when VOBU_1STREF_EA=14. In this case, the system controller 22 specifies sector (2) of ECC block (N) for write start specifying address SSA and sector (6) of ECC block (N+1) for write end specifying address ESA. Then, the system controller 22 controls the track jump controller circuit 19 and the memory controller 5 in such a way that the data from the ECC block (N) to the ECC block (N+1) are transferred from the optical disk 1 by way of the demodulator 3, the sector detector 4 and the memory controller 6 and stored in the ring buffer memory 6 ((a) of FIG. 17: BUFF_WR).

When the sector detector 4 detects the sector (2) of the ECC block (N), it determines that the sector address number of the sector agrees with the write start specifying address SSA and turns the bit for the start sector information of the sector (2) to "1" ((b) of FIG. 17). Additionally, when the sector detector 4 detects the sector (6) of the ECC block (N+1), it determines that the sector address number of the sector agrees with the write end specifying address ESA and turns the bit for the end sector information of the sector (6) to "1" ((c) of FIG. 17). Furthermore, the sector detector 4 turns the bits for the output-specified sector information of the sectors from the sector (2) of the ECC block (N) to the sector (6) of the ECC block (N+1) to "1" ((d) of FIG. 17). Thus, the sector detector 4 generates a first piece of sector information comprising start sector information, end address information and output-specified sector information.

In response to the operation of turning the bits for the output-specified sector information to "1", the stream detector 10 turns the bit for the NAVI sector information of the sector (2) of the ECC block (N) to "1" ((e) of FIG. 17). Additionally, the stream detector 10 makes the bits for the result-of-correction flags from the sector (2) of the ECC block (N) to the sector (6) of the ECC block (N+1) equal to "0" according to the result of the error detection of the error detector 9 ((f) of FIG. 17). Still additionally, the stream detector 10 makes the bit for the IP output information of each sector equal to "1" according to the detection of VOBU_1 STREF_EA added to the sector ((g) of FIG. 17). As a result, the stream detector 10 generates a second piece of sector information comprising the NAVI sector information, the IP output sector information and the result-of-correction flag. Then, the stream detector 10 outputs the generated second piece of sector information to the system controller 22. The system controller 22 so controls the memory controller 5 as to store the input second piece of sector information in the ring buffer memory 6.

Under the condition where the first piece of sector information and the second piece of sector information are stored in the ring buffer memory 6, the system controller 22 controls the memory controller 5 in such a way that the latter reads out the first and second pieces of sector information and outputs the data of the sectors where the logical product of the output-specified sector information and the IP output sector information is equal to "1" from the ring buffer memory 6 to the video decoder 13 when reading the data stored in the ring buffer memory 6 for data reproduction ((h) of FIG. 17: BUFF_RD).

Now, another processing operation of the sector detector 4 and the stream detector 10 of the optical disk reproduction apparatus for generating respectively first and second pieces of sector information will be discussed by referring to FIG. 18.

FIG. 18 shows the state of the section information bits when VOBU_1STREF_EA=0. In this case, the system controller 22 specifies sector (2) of ECC block (N) for write start specifying address SSA and then controls the track jump controller circuit 19 and the memory controller 5 in such a way that the data from the ECC block (N) on are transferred from the optical disk 1 by way of the demodulator 3, the sector detector 4 and the memory controller 6 and stored in the ring buffer memory 6 ((a) of FIG. 18: BUFF_WR).

When the sector detector 4 detects the sector (2) of the ECC block (N), it determines that the sector address number of the sector agrees with the write start specifying address SSA and turns the bit for the start sector information of the sector (2) to "1" ((b) of FIG. 18). Additionally, since the sector detector 4 cannot detect any sector address number after the sector (2) of the ECC block (N) that agrees with the write end specifying address ESA, it turns the bit for the end sector information to "0" ((c) of FIG. 18). Furthermore, the sector detector 4 turns the bit for the output-specified sector information of each sector whose sector address number is detected after the write start specifying address SSA to "11" ((d) of FIG. 18).

In response to the operation of turning the bits for the output-specified sector information to "1", the stream detector 10 turns the bit for the NAVI sector information of the sector (2) of the ECC block (N) to "1," ((e) of FIG. 18) and, additionally, it makes the bits for the result-of-correction flags from the sector (2) of the ECC block (N) to the sector (6) of the ECC block (N+1) equal to "0" according to the result of the error detection of the error detector 9 ((f) of FIG. 18).

Still additionally, the stream detector 10 so judges that no I picture exists in each VOBU because VOBU_1STREF_EA attached to the VOBU is equal to 1, or VOBU_1STREF_EA=1, and makes only the bit for the IP output information of the sector (2) of the ECC block (N) equal to "1" so that only the NAVI pack data may be output from the ring buffer memory 6 to the video decoder 13 ((g) of FIG. 18). Then, the stream detector 10 second piece of sector information it generates to the system controller 22. Then, the system controller 22 so controls the memory controller 5 as to store the input second piece of sector information in the ring buffer memory 6.

Under the condition where the first piece of sector information and the second piece of sector information are stored in the ring buffer memory 6, the system controller 22 controls the memory controller 5 in such a way that the latter reads out the first and second pieces of sector information and outputs only the data of the sectors where the logical product of the output-specified sector information and the IP output sector information is equal to "1" from the ring buffer memory 6 to the video decoder 13 when reading the data stored in the ring buffer memory 6 for data reproduction ((h) of FIG. 18: BUFF_RD).

Now, an operation of the optical disk reproduction apparatus for decoding only I pictures for fast forward reproduction will be described by referring to FIG. 19.

Referring to FIG. 19, firstly, the system controller 22 so controls the memory controller 5 as to start an operation of data reproduction, using write start specifying address SSA (=22) and write end specifying address ESA (=99) ((a) of FIG. 19, PB_DATA).

Then, as the sector detector 4 detects sector (20), the system controller 22 so controls the memory controller 5 as to start writing the data and the first piece of sector information into the ring buffer memory 6 ((b) of FIG. 19, BUFF_WR). More specifically, the system controller 22 controls the memory controller 5 so as to sequentially write the data of the ECC block (2X) and that of the ECC block (3X) into the ring buffer memory 6 from time $t_1$.

When the data of an ECC block is written into the ring buffer memory 6, the system controller 22 controls the memory controller 5 so as to start a processing operation of error correction and error detection ((c) of FIG. 19, ECC).

Then, the system controller 22 analyses the data corrected for errors by means of the stream detector 10 and takes out NV_PCK_LBN (=22) and VOBU_1STREF_EA (=0) from the NAVI pack data. Then, it reselects the section address number obtained by adding NV_PCK_LBN and VOBU_1STREF_EA as write end specifying address ESA (=22) ((d) of FIG. 19, !NEW_ESA SET).

Then, the stream detector 10 detects the IP output end detection signal at time $t_3$ when the processing operation of error correction and error detection is over (ECC_STOP) (!IP_END_DET) and outputs the IP output end detection signal to the system controller 22.

Additionally, the system controller 22 so controls the memory controller 5 that, as the IP output end detection signal is input from the stream detector 10 at time $t_3$, the operation of writing data into the ring buffer memory 6 is suspended ((b) of FIG. 19, WR_STOP) along with the error correcting operation of the error correction circuit 7 ((c) of FIG. 19, ECC_STOP). Still additionally, the system controller 22 also controls the memory controller 5 in such a way that the first piece of sector information generated by the sector detector 4 and the second piece of sector information generated by the stream detector 10 are written into the ring buffer memory 6. Then, the first piece of sector information and the second piece of sector information are input to the system controller 22 as shown in FIG. 18.

Then, the system controller 22 judges that no I picture exists in the VOBU on the basis of the first piece of sector information and the second piece of sector information and so controls the memory controller 5 as to output only the data of the sectors containing a NAVI pack data from the ring buffer memory 6 to the video decoder 13 during the time period between time $t_3$ and time $t_4$.

Then, the video decoder 13 decodes the data of the NAVI pack from the ring buffer memory 6 ((f) of FIG. 19). Since the data decoded by the video decoder 13 does not contain any video data, the image that is reproduced and displayed will not be updated ((g) of FIG. 19).

Thus, an optical disk reproduction apparatus designed to operate in a manner as described above can confirm the end of an operation of taking in an output-specified sector by means of the IP output end detection signal input to the stream detector 10 even if the sector detector 4 cannot detect the sector having a sector address number that agrees with the write end specifying address ESA so that the operation of outputting data from the ring buffer memory 6 for reproduction can be controlled according to the first and second pieces of sector information.

In other words, in an operation of fast reproduction that can be realized by reproducing only I pictures by means of this optical disk reproduction apparatus, if VOBU_1STREF_EA contained in a NAVI pack is equal to 0 and no I picture exists in the VOBU, the I picture existing in the next VOBU can be reproduced by decoding on ly the NAVI pack.

Additionally, it may be so arranged in the optical disk reproduction apparatus that the error pointer EP of the ring buffer memory 6 is made to advance in response to the completion of a processing operation of error correction, descrambling and error detection on each ECC block and also when an IP output end detection signal is detected and no error is detected by the error detector 9 in an operation of reproducing only I pictures for fast forward reproduction.

Then, in the optical disk reproduction apparatus arranged in a manner as described above, the error pointer EP does not advance until an IP output end detection signal is detected so that, if an error is detected in the data of the I picture being taken into the ring buffer memory 6, the error pointer EP remains to the position located at the time when the operation of taking in the I picture started. Therefore, the read pointer would never outrun it and the data of an I picture containing error would never be output to the decoder. Additionally, if an error is detected after an operation of error correction in the optical disk reproduction apparatus, the data reproduction can be retried depending on the amount of outputtable data remaining in the ring buffer memory 6 so that the write pointer WP may be returned to the point indicated by the error pointer EP.

While a single I picture is decoded at a time for fast reproduction in the above description of the above optical disk reproduction apparatus, it will be appreciated that VOBU_2NDREF_EA in the NAVI pack is reselected as write end specifying address ESA and IP output sector information is generated to control the data output from the ring buffer memory 6 when an operation of fast reproduction is conducted by decoding and reproducing an I picture and a P picture.

Additionally, VOBU_3RDREF_EA in the NAVI pack is reselected as write end specifying address ESA and IP output sector information is generated to control the data output from the ring buffer memory 6 when an operation of fast reproduction is conducted by decoding and reproducing three pictures including an I picture and two P pictures or two I pictures and a P picture.

Still additionally, if an operation of fast reproduction is conducted in the above optical disk reproduction apparatus by decoding and reproducing three pictures including an I picture and two P pictures or two I pictures and a P picture, not only a half of the addresses down to the final address VOBU_EA of the VOBU are output to the decoder so that sound may be reproduced when all the end addresses of the I picture(s) and the P picture(s) (VOBU_1STREF_EA, VOBU_2NDREF_EA, VOBU_3RDREF_EA) are equal to 0 or when VOBU_3RDREF_EA is equal to 0 but also NV_PCK_LBN+(VOBU_EA/2) is reselected as write end specifying address ESA and, at the same time, IP output sector information is generated to control the audio data output from the ring buffer memory 6 even when VOBU_1 STREF_EA, VOBU_2NDREF_EA and VOBU_3RDREF_EA of the NAVI pack are all equal to 0.

Finally, in the above optical disk reproduction apparatus, the decoding operation may be skipped depending on the type and number of picture(s) to be decoded and reproduced. For example, if the decoder is operating in a mode for decoding only an I picture, the data of two pictures including an I picture and a P picture may be supplied to the decoder. In other words, the write end specifying address ESA may be computationally determined by using a sector address number greater than VOBU_1STREF_EA. For example, NV_PCK_LBN+(VOBU_1STREF_EA+1) may be reselected as write end specifying address ESA and, at the same time, IP output sector information may be generated to control the data output from the ring buffer memory 6.

In the above describe electrode optical disk reproduction apparatus, the method of computationally determining the write end specifying address ESA to be reselected may be modified by selecting the reproduction mode using only an I picture, the reproduction mode using an I picture and a P picture, the reproduction mode using three pictures including an I picture and two P pictures or two I pictures and a P picture or the mode of outputting three pictures including an I picture and two P pictures or two I pictures and a P picture and sound by means of the system controller 22 to control the memory controller 5. The system controller 22 can selects the reproduction mode using only an I picture or the reproduction mode using three pictures including an I picture and two P pictures or two I pictures and a P picture depending on the time allocated for fast reproduction (the rate of reproduction). Additionally, the system controller 22 is adapted to select the reproduction mode using only an I picture for an operation of title scan where the first I pictures of the titles of the video products recorded in the optical disk 1 are displayed simultaneously on a multiple image basis.

What is claimed is:

1. A data reproduction apparatus comprising:
    a reproduction means for reproducing a data stored in a recording medium;
    a first data information detection means for detecting a first piece of data information proving the rightness or wrongness of reproducing the data as signal, using the address information of the data reproduced by said reproduction means;
    a memory means for storing the data;
    an error correction means for performing an error detecting/error correcting operation on each of the data proved for the rightness of being reproduced as signal by said first piece of data information and storing the data back in said memory means after the error correcting operation;
    a second data information detection means for detecting a second piece of data information indicating a data to be reproduced as signal among the data subjected to the error correcting operation of said error correction means;
    a decoding means for decoding the data subjected to the error correcting operation of said error correction means and stored back in said memory means as reproduced signal; and
    a control means for controlling the data output from said memory means to said decoding means by referring to the first piece of data information detected by said first data information detection means and the second piece of data information detected by said second data information detection means,
    wherein said second piece of data information corresponds to a navigation pack.

2. The data reproduction apparatus according to claim 1, wherein said memory means stores said first data information and said second data information on the basis of the unit of each sector of data to be decoded by said decoder along with the data.

3. The data reproduction apparatus according to claim 1, wherein said memory means is a ring buffer adapted to store the data of at least a track reproduced from said recording medium by said reproduction means or the data of at least a track corrected for errors by said error correction means.

4. The data reproduction apparatus according to claim 3, wherein said control means is adapted to control the data output pointer of said ring buffer according to the second data information detected by said second data information detection means.

5. The data reproduction apparatus according to claim 1, further comprising a memory control means for controlling the input/output of data to be stored in said memory means; said memory control means being adapted to rearrange the data reproduced from said recording medium by said reproduction means and having a data structure of sequentially arranging information data and parity data and stores them in said memory means.

6. The data reproduction apparatus according to claim 1, wherein said first data information detection means is adapted to detect the information indicating the data to be output as signal to be reproduced according to the sector address information added to each sector of the data reproduced by said reproduction means.

7. The data reproduction apparatus according to claim 1, wherein said recording medium is an optical disk adapted to reproduce data when irradiated with light and said reproduction means is an optical pickup.

8. The data reproduction apparatus according to claim 1, wherein video signals are recorded on said recording medium.

9. The data reproduction apparatus according to claim 1, wherein
    said second data information detection means is adapted to generate the information to be reproduced by said reproduction means as second data information according to the added information identifying information for identifying the information added to data, the result-of-correction flag indicating the result of error correction of said error correction means and the data category information indicating the category of information; and
    said reproduction control means is adapted to control said reproduction means according to the second data information detected by said second data information detection means.

10. A data reproduction method comprising:
    reproducing a data stored in a recording medium;
    detecting a first piece of data information proving the rightness or wrongness of reproducing the data as signal by using the address information of the data reproduced by said reproduction means;
    performing an error detecting/error correcting operation on each of the data proved for the rightness of being reproduced as signal by said first piece of data information;
    detecting a second piece of data information indicating a data to be reproduced as signal among the data subjected to the error correcting operation; and
    reproducing the data to be decoded under control by referring to the first piece of data information and the second piece of data information,
    wherein said second piece of data information corresponds to a navigation pack.

11. The data reproduction method according to claim 10, wherein
    said first data information and said second data information are stored in memory means; and
    the data to be decoded are reproduced under control by referring to the first data information and the second data information stored in said memory means.

12. The data reproduction method according to claim 10, wherein the reproduced data of at least a track or the data corrected for errors of at least a track are stored in a ring buffer.

13. The data reproduction method according to claim 12, wherein the data output pointer of said ring buffer is controlled according to said second data information.

14. The data reproduction method according to claim 10, wherein the data reproduced from said recording medium and having a data structure of sequentially arranging information data and parity data are rearranged and stored in said ring buffer.

15. The data reproduction method according to claim 10, wherein the information indicating the data to be output as signal to be reproduced is detected as first data information according to the sector address information added to each sector of the reproduced data.

16. The data reproduction method according to claim 10, wherein said recording medium is an optical disk adapted to reproduce data when irradiated with light and an optical pickup is sued to reproduce data.

17. The data reproduction method according to claim 10, wherein video signals are recorded on said recording medium.

18. The data reproduction method according to claim 10, wherein the added information identifying information for identifying the information added to data, the result-of-correction flag indicating the result of error correction of said error correction means and the data category information indicating the category of information are generated as second data information; and data are decoded by referring to the generated second data information.

* * * * *